US008838587B1

(12) United States Patent
Adams et al.

(10) Patent No.: US 8,838,587 B1
(45) Date of Patent: Sep. 16, 2014

(54) PROPAGATING QUERY CLASSIFICATIONS

(75) Inventors: Henele I. Adams, San Francisco, CA (US); Hyung-Jin Kim, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 276 days.

(21) Appl. No.: 12/762,787

(22) Filed: Apr. 19, 2010

(51) Int. Cl.
*G06F 17/30* (2006.01)

(52) U.S. Cl.
USPC .......................... 707/731; 707/722; 707/732

(58) Field of Classification Search
None
See application file for complete search history.

(56) References Cited

U.S. PATENT DOCUMENTS

| | | | |
|---|---|---|---|
| 5,265,065 A | 11/1993 | Turtle | |
| 5,920,854 A | 7/1999 | Kirsch et al. | |
| 6,006,222 A | 12/1999 | Culliss | |
| 6,014,665 A | 1/2000 | Culliss | |
| 6,078,916 A | 6/2000 | Culliss | |
| 6,134,532 A | 10/2000 | Lazarus et al. | |
| 6,182,068 B1 | 1/2001 | Culliss | |
| 6,327,590 B1 | 12/2001 | Chidlovskii et al. | |
| 6,363,378 B1 | 3/2002 | Conklin et al. | |
| 6,480,843 B2 | 11/2002 | Li | |
| 6,490,575 B1 | 12/2002 | Berstis | |
| 6,539,377 B1 | 3/2003 | Culliss | |
| 6,671,681 B1 | 12/2003 | Emens et al. | |
| 6,792,416 B2 | 9/2004 | Soetarman et al. | |
| 6,816,850 B2 | 11/2004 | Culliss | |
| 6,873,982 B1 | 3/2005 | Bates et al. | |
| 6,912,505 B2 | 6/2005 | Linden et al. | |
| 6,944,612 B2 | 9/2005 | Roustant et al. | |
| 7,072,886 B2 | 7/2006 | Salmenkaita et al. | |
| 7,085,761 B2 | 8/2006 | Shibata | |
| 7,113,939 B2 | 9/2006 | Chou et al. | |
| 7,146,361 B2 | 12/2006 | Broder et al. | |
| 7,222,127 B1 | 5/2007 | Bem et al. | |
| 7,231,399 B1 | 6/2007 | Bem et al. | |
| 7,379,951 B2 | 5/2008 | Chkodrov et al. | |
| 7,516,146 B2 | 4/2009 | Robertson et al. | |
| 7,565,363 B2 | 7/2009 | Anwar | |
| 8,135,710 B2* | 3/2012 | Summerlin et al. | 707/728 |
| 2002/0034292 A1 | 3/2002 | Tuoriniemi et al. | |
| 2002/0103790 A1 | 8/2002 | Wang et al. | |
| 2003/0167252 A1 | 9/2003 | Odom et al. | |
| 2004/0006740 A1 | 1/2004 | Krohn et al. | |
| 2004/0093325 A1 | 5/2004 | Banerjee et al. | |
| 2004/0199419 A1 | 10/2004 | Kim et al. | |
| 2005/0015366 A1 | 1/2005 | Carrasco et al. | |
| 2005/0060310 A1 | 3/2005 | Tong et al. | |
| 2005/0060311 A1 | 3/2005 | Tong et al. | |
| 2005/0102282 A1 | 5/2005 | Linden | |
| 2005/0160083 A1 | 7/2005 | Robinson | |

(Continued)

OTHER PUBLICATIONS

U.S. Appl. No. 10/726,345, filed Dec. 3, 2003, Pearson et al.

(Continued)

*Primary Examiner* — Ajay Bhatia
*Assistant Examiner* — Miranda Huang
(74) *Attorney, Agent, or Firm* — Fish & Richardson P.C.

(57) ABSTRACT

In general, one aspect described can be embodied in a method for determining a classification for a query. The method can include receiving a request to determine whether to assign a classification to a first query, identifying a plurality of search entities that are associated with the first query based upon data associated with each of the plurality of search entities and the first query, and determining whether to assign the classification to the first query based upon classifications for the identified search entities.

23 Claims, 13 Drawing Sheets

(56) References Cited

U.S. PATENT DOCUMENTS

| | | |
|---|---|---|
| 2005/0192946 A1 | 9/2005 | Lu et al. |
| 2005/0240580 A1 | 10/2005 | Zamir et al. |
| 2005/0256848 A1 | 11/2005 | Alpert et al. |
| 2006/0106793 A1 | 5/2006 | Liang |
| 2006/0200556 A1 | 9/2006 | Brave et al. |
| 2007/0038659 A1 | 2/2007 | Datar et al. |
| 2007/0112730 A1 | 5/2007 | Gulli et al. |
| 2007/0130370 A1 | 6/2007 | Akaezuwa |
| 2007/0214131 A1 | 9/2007 | Cucerzan et al. |
| 2008/0082518 A1* | 4/2008 | Loftesness ................. 707/5 |
| 2008/0183660 A1 | 7/2008 | Szulczewski |
| 2009/0228353 A1* | 9/2009 | Achan et al. ................. 705/14 |

OTHER PUBLICATIONS

U.S. Appl. No. 10/878,926, filed Jun. 28, 2004, Battle et al.
U.S. Appl. No. 11/096,726, filed Mar. 31, 2005, Lamping et al.
U.S. Appl. No. 11/556,086, filed Nov. 2, 2006, Diligenti et al.
U.S. Appl. No. 11/556,100, filed Nov. 2, 2006, Diligenti et al.
U.S. Appl. No. 11/556,143, filed Nov. 2, 2006, Kim et al.
U.S. Appl. No. 11/582,767, filed Oct. 17, 2006, Baker et al.
U.S. Appl. No. 11/647,869, filed Dec. 29, 2006, Baker et al.
U.S. Appl. No. 11/647,888, filed Dec. 29, 2006, Baker et al.
U.S. Appl. No. 11/651,282, filed Jan. 9, 2007, Heymans.
U.S. Appl. No. 11/685,095, filed Mar. 12, 2007, Kim et al.
U.S. Appl. No. 11/686,288, filed Mar. 14, 2007, Diligenti et al.
U.S. Appl. No. 11/742,447, filed Apr. 30, 2007, Stets et al.
U.S. Appl. No. 11/781,155, filed Jul. 20, 2007, Diligenti.
U.S. Appl. No. 11/841,313, filed Aug. 20, 2007, Corduneanu et al.
U.S. Appl. No. 12/166,617, filed Jul. 2, 2008, Yang.
U.S. Appl. No. 12/166,700, filed Jul. 2, 2008, Papachristou et al.
U.S. Appl. No. 12/166,718, filed Jul. 2, 2008, Upstill et al.
U.S. Appl. No. 12/331,872, filed Dec. 10, 2008, Le et al.
Agichtein, et al; *Improving Web Search Ranking by Incorporating User Behavior Information*; Aug. 2006; Proceedings of the Twenty-Ninth Annual International ACM SIGIR Conference on Research and Development in Information Retrieval, p. 19-26.
Agichtein, et al; *Learning User Interaction Models for Predicting Web Search Result Performances*; Aug. 2006; Proceedings of the Twenty-Ninth Annual International ACM SIGIR Conference on Research and Development in Information Retrieval, p. 3-10.
Bar-Llan, Keenoy, Levene, Yaari; "Presentation Bias is Significant in Determining User Preference for Search Results—A User X Study"; Journal of the American Society for Information Science and Technology, vol. 60, Issue 1 (p. 135-149), Sep. 2008.
Bar-llan, Mat-Hassan, Levene; "Methods for comparing rankings of search engine results"; Computer Networks: The International Journal of Computer and Telecommunications Networking, vol. 50, Issue 10 (Jul. 2006).
Boyan et al.; *A Machine Learning Architecture for Optimizing Web Search Engines*; Aug. 1996; Internet-based information systems-Workshop Technical Report-American Association for Artificial Intelligence, p. 1-8.
Cutrell, et al.; *Eye tracking in MSN Search: Investigating snippet length, target position and task types*; 2007; Conference on Human Factors in Computing Systems—Proceedings of the SIGCHI Conference on Human Factors in Computing Systems.
Google News archive, Jul. 8, 2003, Webmasterworld.com, [online] Retrieved from the Internet http://www.webmasterwolrd.com/forum3/15085.htm [retrieved on Nov. 20, 2009] 3 pages.

Joachims T. Evaluating retrieval performance using clickthrough data. Proceedings of the SIGIR Workshop on Mathematical/Formal Methods in Information Retrieval; Aug. 12-15, 2002; Tampere, Finland; 2002.
Joachims; *Optimizing search engines using clickthrough data*; 2002; Proceedings of the ACM SIGKDD International Conference on Knowledge Discovery and Data Mining, p. 133-142.
Kelly, et al.; *Implicit Feedback for Inferring User Preference: A Bibliography*; SIGIR Forum, vol. 37, No. 2 (2003), pp. 18-28.
Diligenti, et al., *Users, Queries and Documents: A Unified Representation for Web Mining*, wi-iat, vol. 1, 2009 IEEE/WIC/ACM International Joint Conference on Web Intelligence and Intelligent Agent Technology, 2009, pp. 238-244.
Linden, Greg et al., Amazon.com *Recommendations: Item-to-Item Collaborative Filtering*, [online], http://computer.org/internet/, IEEE Internet Computing, Jan.-Feb. 2003, IEEE Computer Society, pp. 76080.
Burke, Robin, Integrating Knowledge'based and Collaborative-filtering Recommender Systems, AAAI Technical Report WS-99-01. Compilation copyright © 1999, AAAI (www.aaai.org), pp. 69-72.
Grĉar, Miha, *User Profiling: Collaborative Filtering*, SIKDD 2004, Oct. 12-15, 2004, Ljubljana, Slovenia, 4 pages.
Lu, Kuen S., Examiner, U.S. Patent Office, U.S. Appl. No. 11/556,143, filed Nov. 2, 2006, in Office Action mailed Jan. 25, 2010, 14 pages.
Nicole, Kristen, Heeii is StumbleUpon Plus Google Suggestions, [online], Retrieved from the Internet http://mashable.com/2007/05/15/heeii/, 11 pages.
Hofmann, Thomas, *Latent Semantic Models for Collaborative Filtering*, ACM Transactions on Information Systems, vol. 22, No. 1, Jan. 2004, pp. 89-115.
Lemire, Daniel, *Scale and Translation Invariant Collaborative Filtering Systems*, Published in Information Retrieval, 8(1), pp. 129-150, 2005.
Mueller, Kurt A., Examiner, U.S. Patent Office, U.S. Appl. No. 11/685,095, filed Mar. 12, 2007, in Office Action mailed Feb. 8, 2010, 31 pages.
Radlinski et al., *Query Chains: Learning to Rank from Implicit Feedback*, KDD '05, Aug. 21-24, 2005, Chicago, Illinois, USA, 10 pages.
Joachims Radlinski; "Search Engines that Learn from Implict Feedback"; Aug. 2007, IEEE Computer Society.
Schwab, et al., *Adaptivity through Unobstrusive Learning*, 2002, 16(3), pp. 5-9.
Stoilova, Lubomira et al., *GiveALink: Mining a Semantic Network of Bookmarks for Web Search and Recommendation*, LinkKDD '05, Aug. 21, 2005, Chicago, IL, USA, 8 pages.
Xiao, et al., *Measuring Similarity of Interests for Clustering Web-Users*, ADC, 2001, p. 107-114.
Xie et al., *Web User Clustering from Access Log Using Belief Function*, K-CAP '01, Oct. 22-23, 2001, Victoria, British Columbia, Canada, pp. 202-208.
Yu et al., *Selecting Relevant Instances for Efficient and Accurate Collaborative Filtering*, CIKM '01, Nov. 5-10, 2001, Atlanta, Georgia, pp. 239-246.
Zeng et al., *Similarity Measure and Instance Selection for Collaborative Filtering*, WWW '03, May 20-24, 2003, Budapest, Hungary, pp. 652-658.
Joachims, "Evaluating Search Engines Using Clickthrough Data", Cornell University, Department of Computer Science, Draft, Feb. 19, 2002, 13 pages.
Jansen et al., "An Analysis of Web Documents Retrieved and Viewed", School of Information Sciences and Technology, The Pennsylvania State University, the 4$^{th}$ International Conference on Internet Computing, Las Vegas, Nevada, pp. 65-69, Jun. 23-26, 2003, 5 pages.

* cited by examiner

Search History Data 700

Session A 704
- Time A:    Query A
  - Document A; URL A; 12.3 seconds
  - Document B; URL B; 14.5 seconds    708
  - Document C; URL C; 02.0 seconds

- Time B:    Query B 702    710
  - Document D; URL D; 13.5 seconds
  - Document E; URL E; 04.2 seconds
  - Document F; URL F; 12.2 seconds Session B 706
- Time A:    Query C
  - Document G; URL G; 09.2 seconds
  - Document H; URL H; 24.4 seconds
  - Document I;  URL I;  18.1 seconds

- Time D:    Query A
  - Document A; URL A; 14.3 seconds
  - Document K; URL K; 12.4 seconds
  - Document L; URL L; 02.2 seconds

- Time E:    Query E
  - Document M; URL M; 18.7 seconds
  - Document N; URL N; 06.7 seconds
  - Document O; URL O; 15.0 seconds

FIG. 7

PROPAGATING QUERY CLASSIFICATIONS

BACKGROUND

The present disclosure relates to ranking of search results.

Internet search engines typically operate by storing information about many web pages, which they retrieve from the World Wide Web (WWW) using a Web crawler that follows hyperlinks on pages it encounters. The contents of each page are typically analyzed to determine how the page should be indexed (for example, words are extracted from the titles, headings, or special fields called meta tags). Data about web pages are stored in an index database for use in later queries. When a user enters a query into a search engine, the search engine examines its index and provides a listing of best-matching web pages according to its criteria, usually with a short summary containing the document's title and sometimes parts of the text. While there may be millions of web pages that include a particular word or phrase, some pages may be more relevant, popular, or authoritative than others. Most search engines employ techniques to rank the results to provide the "best" results first.

SUMMARY

In general, one aspect of the subject matter described in this specification can be embodied in a method for determining a classification for a query. The method can include receiving a request to determine whether to assign a classification to a first query, and identifying a plurality of search entities that are associated with the first query based upon data associated with each of the plurality of search entities and the first query. The method can further include determining that the classification is assigned to a portion of the plurality of identified search entities, and selecting a group of search entities from the plurality of search entities that have a greatest association with the first query. The method can additionally include determining that the classification is assigned to a portion of the selected group of search entities, where the portion of the selected group of search entities to which the classification is assigned is a subset of the portion of the plurality of search entities to which the classification is assigned. The method can also include determining that the classification be assigned to the first query based upon (i) the portion of the plurality of identified search entities to which the classification is assigned being greater than a threshold number of search entities and (ii) the portion of the plurality of identified search entities to which the classification is assigned being consistent with the portion of the group of selected search entities to which the classification is assigned. The method can further include providing an indication that the classification be assigned to the first query.

These and other embodiments can optionally include one or more of the following features. The plurality of identified search entities can include a plurality of documents and where, for each of the plurality of documents, the associated data is indicative of user behavior relative to the document as a search result for the first query. The plurality of identified search entities can include a plurality of sites, and where, for each of the plurality sites, the associated data is indicative of user behavior relative to documents associated within the site as a search result for the first query. The plurality of identified search entities can include a plurality of web domains, and where, for each of the plurality of web domains, the associated data is indicative of user behavior relative to documents associated with the web domain as a search result for the first query. The plurality of identified search entities can include a plurality of second queries distinct from the first query. The associated data can be indicative of the first query being submitted in a same query session as the plurality of second queries.

The method for determining a classification for a query can additionally include selecting a subgroup of search entities from the selected group of search entities that have associated data indicative of a greatest association with the first query in relation to other search entities from the group of search entities that are not selected. The method can also include identifying that the classification is assigned to a second portion of the selected subgroup of search entities, and determining that first portion of the plurality of search entities is consistent with the second proportion of the selected group of the plurality of search entities by comparing a first number of search entities including the first portion of the plurality of search entities with a second number of search entities including the second portion of the selected group of the plurality of search entities.

The method for determining a classification for a query can further include, for each search entity of the first portion of the plurality of identified search entities, weighting the classification assigned to the search entity based upon the data associated with each of the plurality of search entities and the first query. Determining that the classification be assigned to the first query can be further based upon the weighted classifications assigned to the first portion of the plurality of identified search entities being greater than a threshold number of search entities. The method for determining a classification for a query can also include determining, for each search entity of the identified plurality of search entities, that there is a threshold amount of data associated with the search entity and the first query. The method for determining a classification for a query can additionally include providing the classification of the first query as input to a document ranking process for ranking a plurality of documents in response to the first query. The classification can be pornography.

Particular embodiments of the invention can be implemented to realize one or more of the following advantages. The accuracy by which a query can be classified is increased by deriving the query classification from documents, and other search entities, that users have indicated are the most relevant to the query. Such improved accuracy can additionally improve the relevance of search results responsive to a query. For instance, specific information regarding the classification can be presented with the query results (e.g., price information for a query classified as a product query).

Additionally, accuracy by which a document can be classified is increased by deriving the document classification from queries, and other search entities, that users have indicated are the most relevant to the document. This improved accuracy can provide a number of benefits, such as increasing the precision and effectiveness of filters, and making information provided to summarize a document (e.g., document description provided in search results) more representative of the content of the document. For example, if a document is classified as product-type document, then the information summarizing the document can include the most pertinent product-related information from the document, such as product title, product description, price, availability, etc.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

FIG. 7 illustrates an example representation of search history data for multiple sessions.

Like reference numbers and designations in the various drawings indicate like elements.

DETAILED DESCRIPTION

Figure 1:
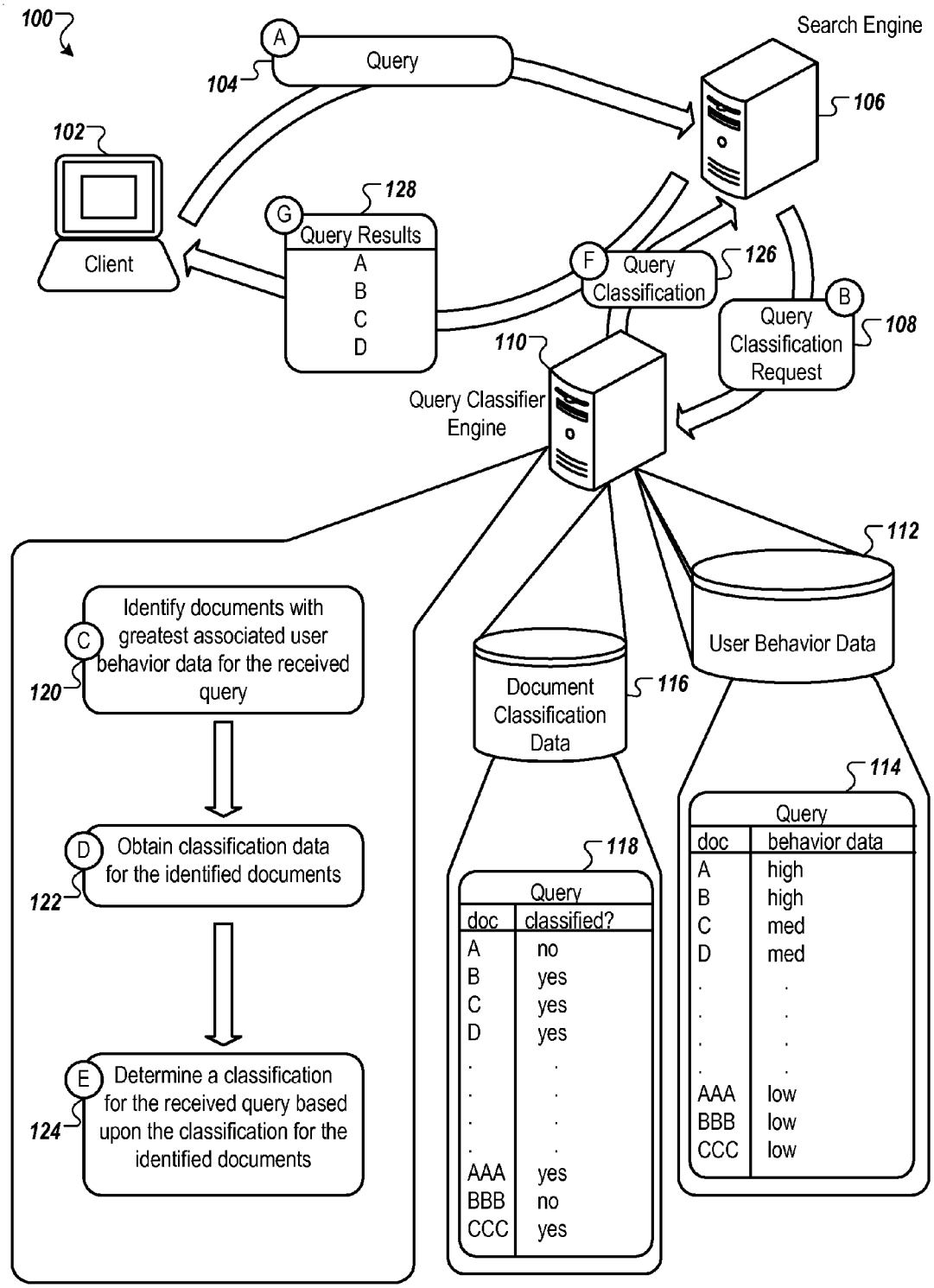
FIG. 1 shows a diagram illustrating improved classification of a query by propagating a classification to the query from documents associated with the query via user behavior data.

FIG. 1 shows a diagram 100 illustrating improved classification of a query by propagating a classification to the query from documents associated with the query as determined based on user behavior data. Classification of a query can involve associating a label, tag, category, and so on, with a query. Examples of query classifications include products (e.g., query relates to the purchase of goods), images/videos, geographic location (e.g., query related to a map), news, adult content (e.g., pornography). Other query classifications are possible, however. A query classification can be used in a variety of ways to improve the quality of search results responsive to queries. For instance, if a received query is classified as a product query (e.g., query for "downhill ski boots, men's size 9"), a search engine can provide results in a product-oriented format with product specific information (e.g., list retailers selling a product sorted by price) instead of in a generic query result list. Such a product-oriented format can present a user with more relevant information to the received query and, in turn, permit the user to make a more informed selection of the results presented.

Given the brevity of many queries, query classifications based upon a query itself can be difficult to accurately determine. For instance, the query "lincoln" could be classified as pertaining to a historical figure (e.g., President Lincoln), a geographic location (e.g., Lincoln, Nebr.), a product (e.g., Lincoln brand of car), etc. However, by propagating or using classification information to a query from documents for which there is user behavior data associated with the query, a classification intended by users for the query can manifest itself in the form of the propagated classification. Described in more detail below, user behavior data can provide an indication as to which documents (e.g., web pages) users have found to be relevant as results for a particular query. The diagram 100 illustrates an example implementation whereby propagation of classification information from documents that have been identified as having a greatest amount of user behavior data associated with the query—meaning, classification information from the documents deemed the most relevant to the query by users is transferred to the query.

Expanding upon the previous example regarding the query "lincoln", assume that in response to the query results for the query "lincoln" that users most frequently select (e.g., click, verbally choose, touch icon, etc.) a document listed in the query results that is classified as a product (e.g., pertaining to a Lincoln automobile). Such user behavior data can be used to determine that it is likely that in the future, when a user submits the query "lincoln," that user intends for the query to pertain to a product. As such, the query can be classified as a product, which can in turn allow the search engine 106 to emphasize products in the search results (e.g., place a products section at the top of the query results in order to provide the most relevant results at the top).

In various implementations, a client 102 submits an input query 104 to a search engine 106 and the search engine 106 returns results responsive to the input query 104 to the client 102. The search engine 106 can be a computing device (e.g., a server) that locates information (e.g., documents) that is relevant to a received query. The search engine 106 produces query results that are an ordered list of documents determined to be responsive to the input query 104, with the most relevant documents being provided at the top of the list. The search engine 106 determines relevance based, at least in part, on document content. In producing the results in response to the input query 104, the search engine 106 can submit a request 108 for classification information associated with the query 104. The search engine 106 can use such classification information to improve the query results in a variety of aspects, such as identifying responsive documents to the query (e.g., locating documents having the same classification as the query), presenting documents with information that is specific to the query's classification (e.g., price for product classified queries), using filters to remove inappropriate documents (e.g., employing filters for queries classified as pertaining to adult content), for example.

The diagram 100 shows an example framework for improving classification of the received query 104 and improving the results produced by the search engine 106 (e.g., providing results that are the most relevant to the query 104 based upon the classification) through the use of a query classifier engine 110. In particular, the query classifier engine 110 can improve the classification for the query 104 by using classification information from documents deemed the most relevant to the query 104. The query classifier engine 110 is a computing device (e.g., a server) that interacts with the search engine 106 (e.g., communicates with the search engine 106 over a network) to classify queries that have been received by the search engine 106.

To derive a classification for the query 104, the query classifier engine 110 can employ a user behavior data repository 112. The user behavior data repository 112 can store user behavior data and/or quality of result statistics derived from the user behavior data. The classification information for the query 104 can be derived from documents which are selected based upon user behavior data, quality of result statistics, or any combination thereof.

A quality of result statistic for a document is derived from user behavior data associated with the document. One example of user behavior data is "click data." Click data refers to how long a user views or "dwells" on a query result document after selecting it (e.g., clicking on the query result, selecting the result by a voice command, touching an icon associated with the query result, etc.) in a document results list a query. For example, a longer time spent dwelling on a document, termed a "long click", can indicate that a user found the document to be relevant for their query. A brief period viewing a document, termed a "short click", can be interpreted as a lack of document relevance. Another type of user behavior data is based on tracking eye movements of users as they view search results. Other types of user behavior data are possible. In various implementations, the click data is a count of each click type (e.g., long, medium, short) by users for a document listed as a result for a particular input query (a query previously submitted to the search engine 1006) and document combination. Click data from a historical query (e.g., a previously received query for which click data has been received) for a given document can be used to create a quality of result statistic for that document. By way of illustration, a quality of result statistic can be a weighted average of the count of long clicks for a given document and query. Other ways of determining a quality of result statistic for a document are possible.

Another example of user behavior data is purchase decision data. Such user behavior data can be based on, for example, products searched for by consumers, products viewed by consumers, details regarding the viewing of products, and products purchased by consumers.

In various implementations and by way of illustration, user behavior data is generated by a process that creates a record for documents that are selected by users in response to a specific query. Each record (herein referred to as a tuple: <document, query, data>) comprises a query submitted by users, a document reference indicating the document selected by users in response to the query, and an aggregation of click data for all users or a subset of all users that selected the document reference in response to the query. In some implementations, extensions of this tuple-based approach to user behavior data are possible. For instance, the user behavior data can be extended to include location-specific (e.g. country, state, etc) or language-specific identifier. With such identifiers included, a country-specific tuple would include the country from where the user query originated from in whereas a language-specific tuple would include the language of the user query.

For simplicity of presentation, the user behavior data associated with documents A-CCC for the query 104 is depicted in a table 114 as being either a "high," "med," or "low" amount of favorable user behavior data (e.g., user behavior data indicating relevance between the document and the query 104). Favorable user behavior data for a document can indicate that the document is frequently selected by users when it is viewed in the results for the query 104 and/or that, when a users view the document after selecting it from the results for the query 104, the users view the document for a long period of time (e.g., the user finds the document to be relevant to the query 104). Although quality of result statistics can also be used to determine the documents from which classification information for the query 104 is derived, as described above, for simplicity of presentation the only user behavior data is depicted.

In some implementations, the query classifier engine 110 can also use a document classification data repository 116 to propagate classification information from documents to the query 104. The document classification data repository 116 can store multiple classifications for each document (e.g., a document can be assigned more than one classification). For instance, a document regarding ice skates can be assigned a classification as a product and a classification as a pertaining to sports. For simplicity of presentation, a table 118 provides classification for each of the documents A-CCC for a single (generic) classification (e.g., the product classification). Although each document is either assigned the generic classification or it is not (e.g. "yes" or "no"), a classifications can additionally be provided as a likelihood of classification (e.g., a normalized weight ranging from 0.0 to 1.0 where 0.0 corresponds to "no" and 1.0 corresponds to "yes"). The document classification data repository 116 can be populated with data regarding document classifications in a variety of manners, such as document content analysis, metadata associated with the document self-identifying a classification for the document, association with a domain or site (e.g., a document hosted on the domain of an online retailer can be classified as a product), associated query classification analysis (see FIG. 6B), etc.

In the example diagram 100, after receiving the query classification request 108 the query classifier engine 110 identifies documents having the greatest amount of associated user behavior data (e.g., the documents associated with greatest number of long clicks) for the received query 104 (step 120). The query classifier engine 110 can identify the documents having the greatest amount of associated user behavior data associated with the query 104 from the user behavior data repository 112. For instance, the user behavior data repository 112 can provide a list of the 100 documents having the greatest amount of associated user behavior data associated with the query. The number of documents identified at step 120 can be a fixed number (e.g., 10, 100, 200, 500, 1000, 5000, etc.) or a can be a variable number that is dependent upon user behavior data (or quality of result statistics) for the documents and the query 104 (e.g., select all documents having a threshold amount of user behavior data (e.g., "med" level of data) associated with the query 104).

As described above, these identified documents can be termed the documents that users have found to be the most relevant to the query 104. Although document identification is depicted as being based upon user behavior data (e.g., data regarding user interactions with documents in response to the query 104) in this example, documents can also be identified at step 120 based upon a quality of result statistics for the documents and the query 104 or a combination of quality result statistics and user behavior data.

Classification data for the identified documents is retrieved using the document classification data repository 116 (step 122), for example. The classification data that is retrieved can be limited to the specific classification requested for the query by the query classification request 108. As described above, each document can be associated with several classifications. In the depicted illustration, the classification is a generic classification for which any classification could be substituted (e.g., product, geographic location, pornography, etc.).

The classification for the query 104 is determined by the query classifier engine 110 using the received classification data for the identified documents (step 124). The query classifier engine 110 can make a determination based upon whether a threshold number (e.g., 5, 10, 50, 100, 500, 1000, etc.) or percentage (e.g., 100%, 95%, 90%, 75%, 66%, 50%, 33%, 25%, 20%, etc.) of the identified documents has been assigned the classification at issue. In various implementations, a consistency check can be performed between classification data for all of the identified documents and a portion of the documents (e.g., a percentage of the identified documents, a fixed number of the identified documents, etc.) having the greatest user behavior data or quality of result statistic. For example, if 1000 documents are identified and their associated classification data meets a 50% threshold for classifying the query 104, a consistency check can be performed by examining whether the top 10 documents of the 1000 documents (based upon user behavior data or quality of result statistic) also meet the 50% threshold. If there is consistency between the top documents and all of the identified documents, then the classification can be assigned to the query 104.

In various implementations, classification data for each of the identified documents can be weighted based upon the associated user behavior data or the quality of result statistic. The weighted classification data can then be combined at step 124. By weighting classification data for the documents, a document that is more relevant (e.g., the document A has a "high" amount of user behavior data for the query 104) can affect the classification of the query 104 more than a document that is less relevant (e.g., document CCC which has a "low" amount of user behavior data for the query 104).

Once the classification for the query 104 has been determined by the query classifier engine 110, the query classifier engine 110 provides a classification 126 for the query 104 to the search engine 106. As described previously, the search engine 106 can use the query classification to improve the query results for the query 104 in a variety of manners, such as providing information in the results that is specific to classification (e.g., price information for a query classified as pertaining to products). The search engine 106 provides such improved query results 128 to the client 102.

In various implementations, classifying a query is performed by the query classifier engine 110 "offline"—meaning that the steps 120-124 are not performed in response to the query 104 being received by the search engine 106. In such implementations, the steps 120-124 for the query 104 can be performed at regular intervals of time by the query classifier engine 110 and the classification for the query 104 can be stored in a query classification data repository (not depicted). In response to receiving the query classification request 108, the query classifier engine 110 can retrieve and return the most recent classification for the query 104 from the query classification data repository. Such implementations can improve the speed of the search engine 106 in responding to the query 104.

Query classifications can also be determined using classification data for other search entities. Search entities can include a variety of search and results related aspects, such as documents, domains (e.g., www.domain.com), sites (e.g., www.domain.com/site), sessions (e.g., string of queries executed during a browsing session), query transitions (e.g., a degree of relatedness between queries), etc. Query classifications can also be determined by the query classifier engine 110 using classification data associated with other search entities. For example, in response to the query classification request 108, classification data for sites having user behavior data or quality of result statistics (such site data can be an aggregation of data or statistics for documents hosted on the site) for the query 104 can be analyzed.

Similar techniques can be used to classify documents based upon query classifications. Using the query classifier engine 110 or a similar classifier engine, a document can be classified based upon the classifications of queries for which the document was previously selected as a search result. For example, if a web page (an example document) contains content related to gardening and it has most commonly been selected in search results for queries classified as "product" queries, then the web page can be classified as a "product" document.

The above-described techniques for query classification (based upon document classifications) and document classification (based upon query classifications) can be combined to increase propagation of classifications across queries and documents. For example, query classification and document classification can be iteratively performed. In an example first iteration, classifications can be propagated from documents to queries. In an example second iteration, the classifications for queries determined in the first iteration can be propagated to documents. In an example third iteration, classifications for documents determined in the third iteration can be propagated to queries. This cycle can repeat until an end condition is met, such as a threshold number of iterations (e.g., 2, 3, 5, 8, 13, 20, etc.), convergence of document and/or query classifications (e.g., iteration at which a classification has stopped being propagated to a threshold number of new queries and/or documents), etc.

Figure 2:
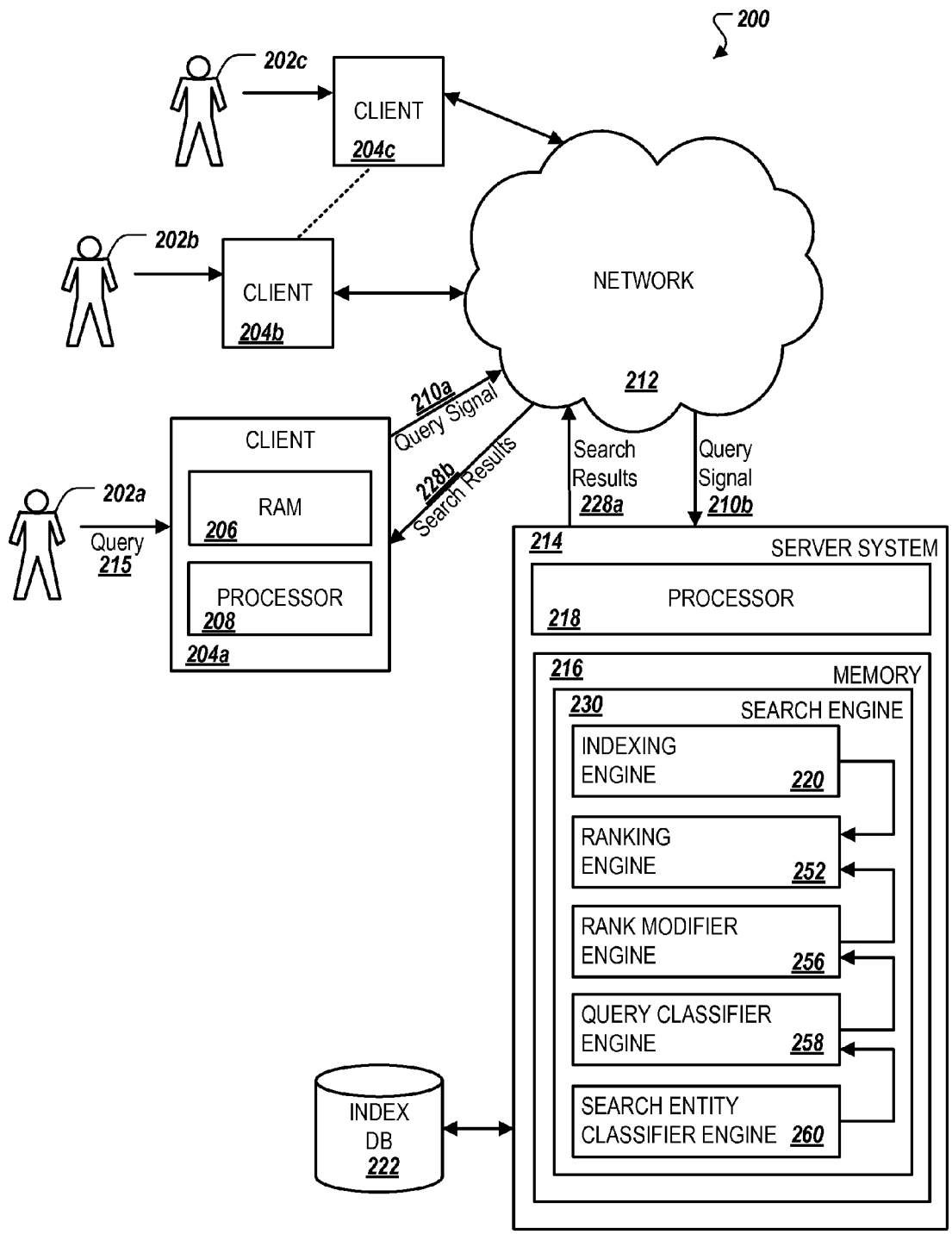
FIG. 2 shows an example system for classifying a query and for improving the relevance of results obtained from submitting search queries.

FIG. 2 shows an example system 200 for classifying a query and for improving the relevance of results obtained from submitting search queries in various implementations. The system 200 is an example of an information retrieval system in which the systems, components and techniques described below can be implemented. Although several components are illustrated, there may be fewer or more components in the system 200. Moreover, the components can be distributed on one or more computing devices connected by one or more networks or other suitable communication mediums.

A user 202 (202a, 202b, 202c) can interact with the system 200 through a client device 204 (204a, 204b, 204c) or other device. For example, the client device 204 can be a computer terminal within a local area network (LAN) or wide area network (WAN). In another example, the client device 204 can be a mobile device (e.g., a mobile phone, a mobile computer, a personal desktop assistant, etc.) that is capable of communicating over a LAN, a WAN, or some other network (e.g., a cellular phone network). The client device 204 can include a random access memory (RAM) 206 (or other memory and/or a storage device) and a processor 208. The processor 208 is structured to process instructions and data within the system 200. In some implementations, the processor 208 is a single-threaded or multi-threaded micro-processor having one or more processing cores. The processor 208 is structured to execute instructions stored in the RAM 206 (or other memory and/or a storage device included with the client device 204) to render graphical information for a user interface.

A user 202a can connect to the search engine 230 within a server system 214 to submit an input query 215. When the user 202a submits the input query 215 through an input device attached to a client device 204a, a client-side query signal 210a is sent into a network 212 and is forwarded to the server system 214 as a server-side query signal 210b. Server system 214 can be one or more server devices in one or more locations. A server device 214 includes a memory device 216, which can include the search engine 230 loaded therein. A processor 218 is structured to process instructions within the device 214. These instructions can implement one or more components of the search engine 230. The processor 218 can be a single-threaded processor or a multi-threaded processor, and can include multiple processing cores. The processor 218 can process instructions stored in the memory 216 related to the search engine 230 and can send information to the client device 204, through the network 212, to create a graphical presentation in a user interface of the client device 204 (e.g., a search results web page displayed in a web browser).

The server-side query signal 210b is received by the search engine 230. The search engine 230 uses the information within the input query 215 (e.g. query terms) to find relevant documents. The search engine 230 can include an indexing engine 220 that actively searches a corpus (e.g., web pages on the Internet) to index the documents found in that corpus, and the index information for the documents in the corpus can be stored in an index database 222. This index database 222 can be accessed to identify documents related to the user query 215. Note that, an electronic document (which for brevity will simply be referred to as a document) does not necessarily correspond to a file. A document can be stored in a portion of a file that holds other documents, in a single file dedicated to the document in question, or in multiple coordinated files. Moreover, a document can be stored in a memory without having first been stored in file.

The search engine 230 can include a ranking engine 252 to rank the documents related to the input query 215. The ranking of the documents can be performed using traditional techniques for determining an information retrieval (IR) score for indexed documents in view of a given query. The IR score for a document can provide a metric of the document's relevance to the query. The relevance of a particular document with respect to a particular search term or to other provided information may be determined by any appropriate technique. For example, the general level of back-links to a document that contains matches for a search term may be used to infer a document's relevance. In particular, if a document is linked to (e.g., is the target of a hyperlink) by many other relevant documents (e.g., documents that also contain matches for the search terms), it can be inferred that the target document is particularly relevant. This inference can be made because the authors of the pointing documents presumably point, for the most part, to other documents that are relevant to their audience.

If the pointing documents are in turn the targets of links from other relevant documents, they can be considered more relevant, and the first document can be considered particularly relevant because it is the target of relevant (or even highly relevant) documents. Such a technique may be the determinant of a document's relevance or one of multiple determinants. Appropriate techniques can also be taken to identify and eliminate attempts to cast false votes so as to artificially drive up the relevance of a page.

To further improve such traditional document ranking techniques, the ranking engine 252 can receive an additional signal from a rank modifier engine 256 to assist in determining an appropriate ranking for the documents. The rank modifier engine 256 provides one or more measures of relevance for the documents, which can be used by the ranking engine 252 to improve the search results' ranking provided to the user 202. The rank modifier engine 256 can perform operations to generate the one or more measures of relevance.

The search engine 230 can additionally include a query classifier engine 258 and a search entity classifier engine 260. The query classifier engine 258 can perform one or more of the operations described above and below in this document to generate a classification for a query. The query classifier engine 258 can provide classification information for the received query signal 210b to the rank modifier engine 256, which can use the classification information to improve the relevancy of query results. The search entity classifier engine 260 can perform operations to classify search entities, such as documents, sites, domains, etc. The search entity classifier engine 260 can provide classification information for search entities to the query classifier engine 258.

The search engine 230 can forward the final, ranked result list within a server-side search results signal 228a through the network 212. Exiting the network 212, a client-side search results signal 2028b can be received by the client device 204a where the results can be stored within the RAM 206 and/or used by the processor 208 to display the results on an output device for the user 202a.

Figure 3:
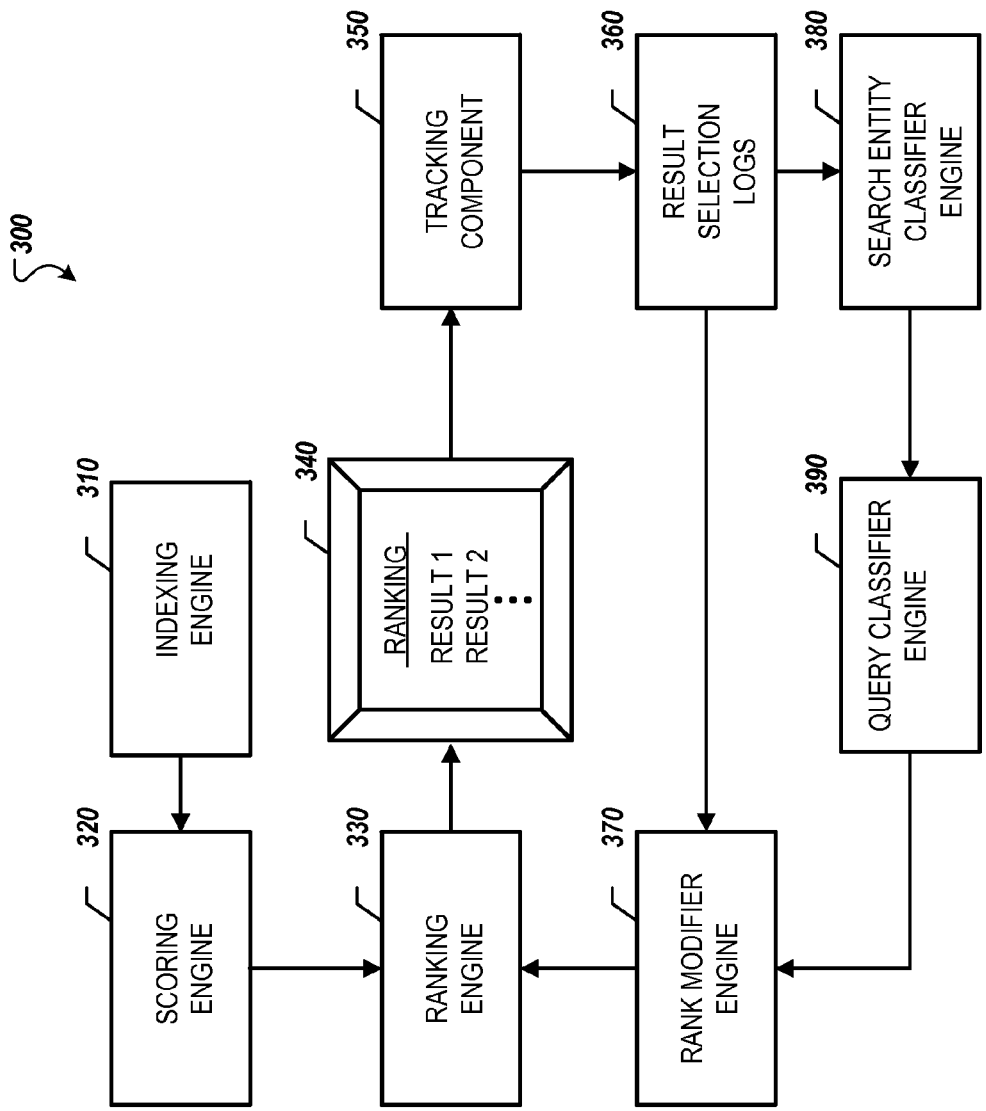
FIG. 3 shows example components of an information retrieval system.

FIG. 3 shows example components of an information retrieval system 300. These components can include an indexing engine 310, a scoring engine 320, a ranking engine 330, a rank modifier engine 370, a search entity classifier engine 380, and a query classifier engine 390. The indexing engine 310 can function as described above for the indexing engine 220. The rank modifier engine 370 can function as described above with regard to the rank modifier engine 256. The search entity classifier engine 380 can function as described above for the search entity classifier engine 258. The query classifier engine 390 can function as described above with respect to the query classifier engine 110 and the query classifier engine 260. In addition, the scoring engine 3020 can generate scores for document results based on many different features, including content-based features that link a query to document results, and query-independent features that generally indicate the quality of documents results. The content-based features can include aspects of document format, such as query matches to title or anchor text in an Hypertext Markup Language (HTML) page. The query-independent features can include aspects of document cross-referencing. Moreover, the particular functions used by the scoring engine 320 can be tuned, to adjust the various feature contributions to the final IR score, using automatic or semi-automatic processes.

The ranking engine 330 produces a ranking of document results 340 for display to a user based on IR scores received from the scoring engine 320 and one or more signals from the rank modifier engine 370. A tracking component 350 can be used to record information regarding user behavior such as individual user selections of the results presented in the ranking 340. For example, the tracking component 350 can be embedded JavaScript code included in a web page ranking 340 that identifies user selections (e.g., mouse clicks) of individual document results and also identifies when the user returns to the results page, thus indicating the amount of time the user spent viewing the selected document result. In other implementations, the tracking component 350 is proxy system through which user selections of the document results are routed, or the tracking component can include pre-installed software at the client (e.g., a toolbar plug-in to the client's operating system). Other implementations are also possible, such as by using a feature of a web browser that allows a tag/directive to be included in a page, which requests the browser to connect back to the server with message(s) regarding link(s) clicked by the user.

The recorded information can be stored in result selection logs 360. The recorded information can include log entries that indicate, for each user selection, the query (Q), the document (D), the user's dwell time (T) on the document, the language (L) employed by the user, and the country (C) where the user is likely located (e.g., based on the server used to access the IR system). Other information indicative of user behavior can also be recorded, such as user interactions with a presented ranking, including negative information, such as the fact that a document result was presented to a user, but was not clicked, position(s) of click(s) in the user interface, information about the session (e.g., existence and type of previous clicks, and post-click session activity), IR scores of clicked results, IR scores of all results shown before click, the titles and snippets shown to the user before the click, the user's cookie, cookie age, IP (Internet Protocol) address, user agent of the browser, etc.

In various implementations, the time (T), also known as "click data", is measured as the time between the initial click through to the document result until the time the user comes back to the main page and clicks on another document result. In general, an assessment is made about the time (T) regarding whether this time indicates a longer view of the document result or a shorter view of the document result, since longer views are generally indicative of quality or relevance for the clicked through result. This assessment about the time (T) can further be made in conjunction with various weighting techniques.

The search entity classifier engine 380 and the query classifier engine 390 can use the result selection logs 360 to identify queries that are relevant to search entities and search entities that are relevant to queries for the purpose of determining classifications. The determined classifications can be provided to the rank modifier engine 370 for use in improving the relevance of query results.

The components shown in FIG. 3 can be combined in various manners and implemented in various system configurations. For example, the scoring engine 320 and the ranking engine 330 can be merged into a single ranking engine, such as the ranking engine 252 of FIG. 2. The rank modifier engine 370 and the ranking engine 330 can also be merged, and in general, a ranking engine includes any software component that generates a ranking of document results after a query. The search entity classifier engine 380 and the query classifier engine 390 can be merged into a single classifier engine. Moreover, a ranking engine can be included in a client system in addition to (or rather than) in a server system.

Figure 4:
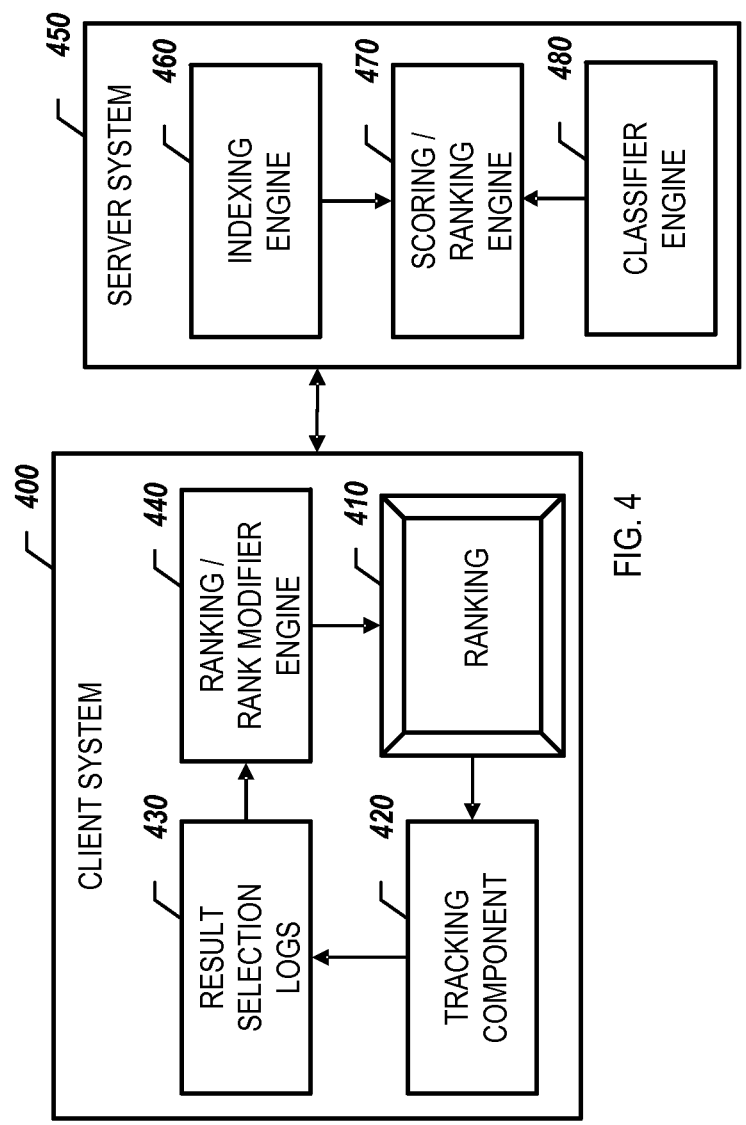
FIG. 4 shows another example information retrieval system.

FIG. 4 shows another example information retrieval system. In this system, a server system 450 includes an indexing engine 460, a scoring/ranking engine 470, and a classifier engine 480. A client system 400 includes a user interface for presenting a ranking 410, a tracking component 420, result selection logs 430 and a ranking/rank modifier engine 440. The ranking/rank modifier engine 440 can perform at least some of the functionality described above with regard to the query results rank modifier 256. For example, the client system 400 can include a company's enterprise network and personal computers, in which a web browser plug-in incorporates the ranking/rank modifier engine 440. When an employee in the company initiates a search on the server system 450, the scoring/ranking engine 470 can return the search results along with either an initial ranking or the actual IR scores for the results. The browser plug-in can then re-rank the results locally based on tracked page selections for the company-specific user base.

Figure 5A:
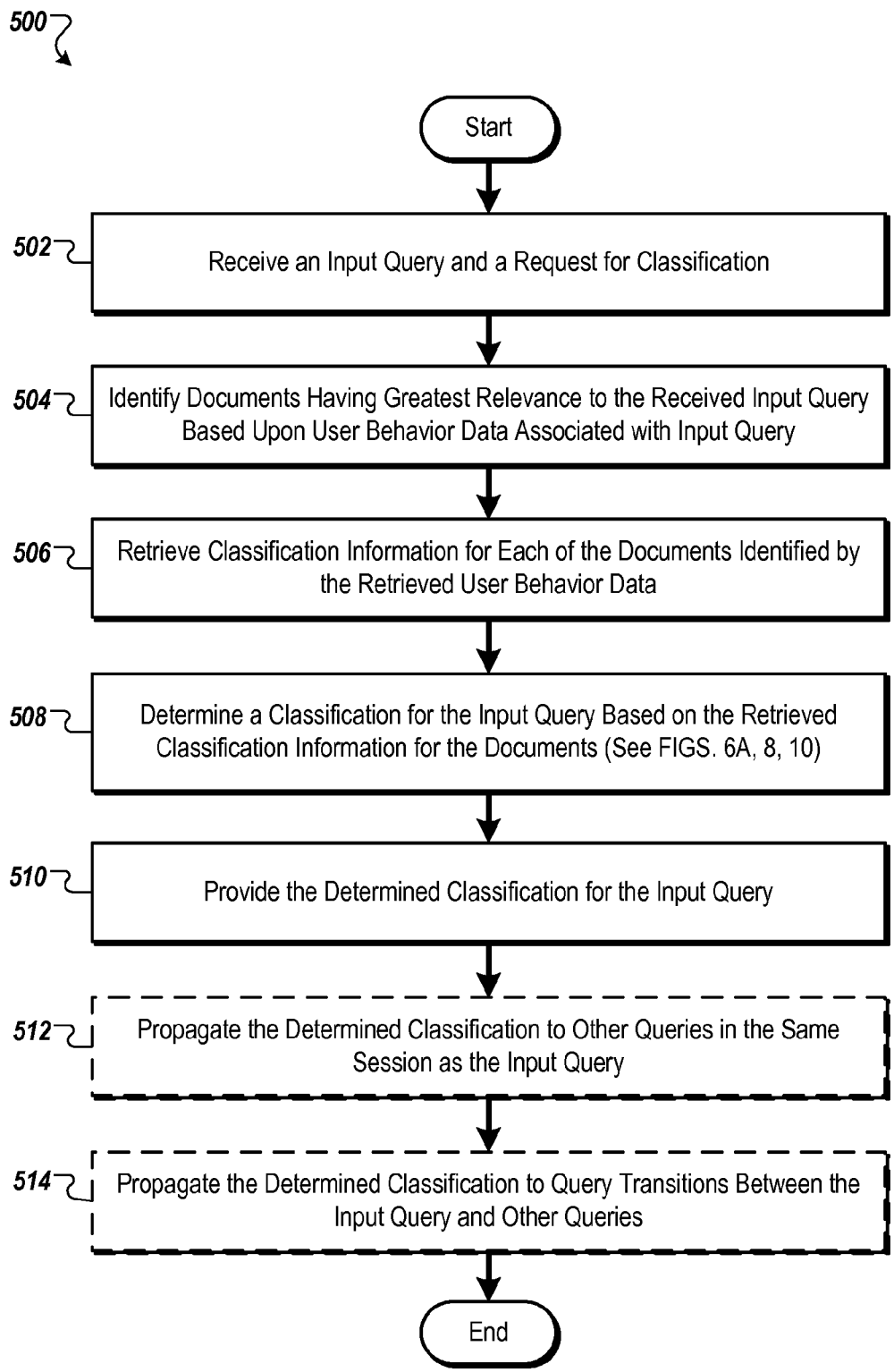
FIGS. 5A-B are flow charts describing an example techniques for classifying a query using classification information for documents that are relevant to the query.
Figure 5B:
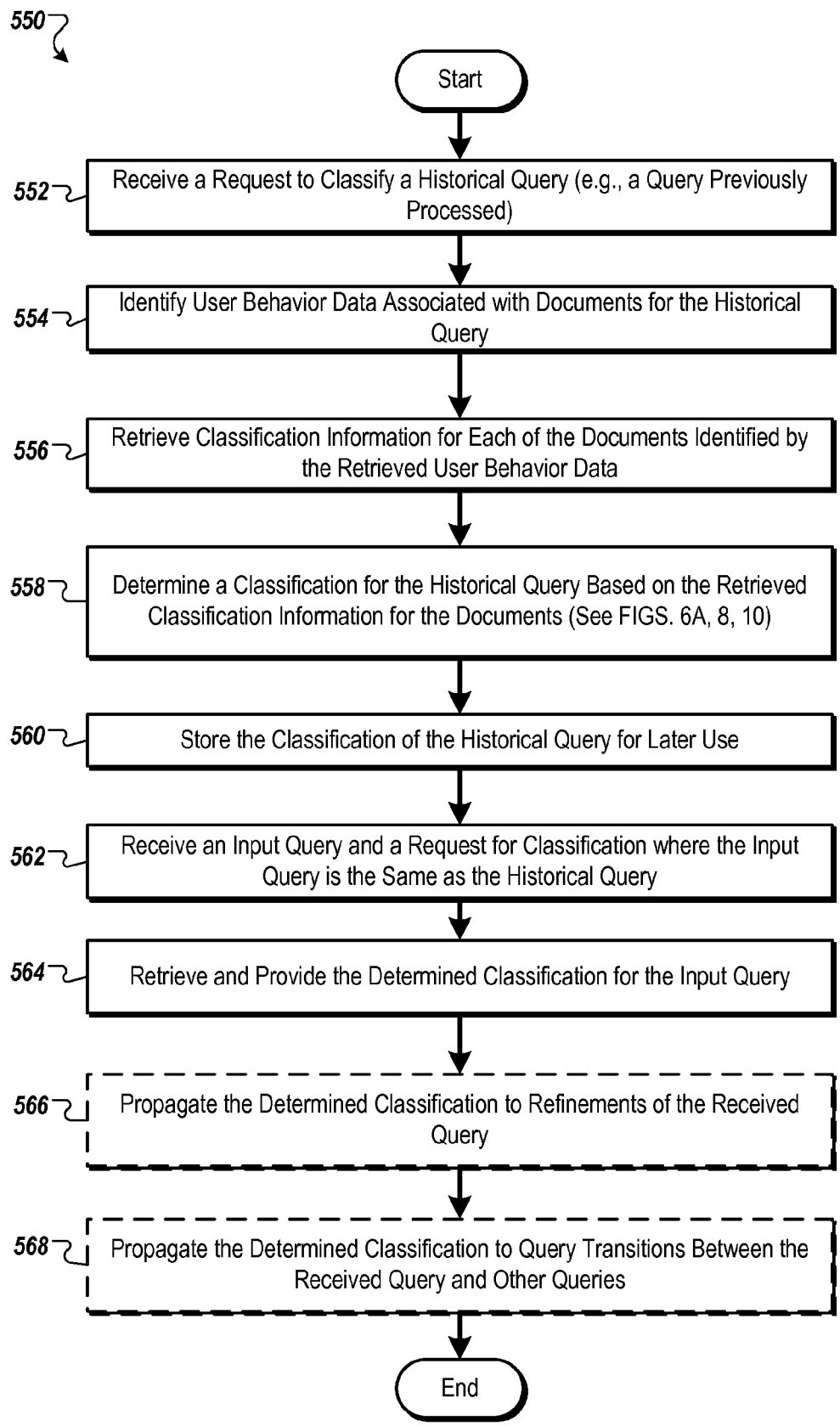

FIGS. 5A-B are flow charts describing an example techniques 500 and 550, respectively, for classifying a query using classification information for documents that are relevant to the query. The technique 500 regards "on-line" processing of a request for classification information of an input query and the technique 550 regards "off-line" processing of a request for classification information for a previously submitted and processed query (e.g., a historical query). The techniques 500 and 550 can be performed by a variety of systems including, for example, by the server system 214 and query classifier engine 258, as described with reference to FIG. 2, or by the information retrieval system 300 and its query classifier engine 380, as described with reference to FIG. 3.

Referring to FIG. 5A, the technique 500 begins at step 502 by receiving an input query and a request for classification of the input query. The input query can be submitted over a variety of environments (e.g., Internet, intranet, local machine). For example, the user 202a can submit the input query 215 over the network 212 using client 204a. The input query can be received at a search engine, such as search engine 106. The request for classification of the input query can be received at a query classifier engine, such as query classifier engine 110, from a search engine, such as search engine 106.

Documents that are the most relevant to the received input query are identified based upon user behavior data (or quality of result statistics) associated with the input query for the documents (step 504). As described above with regard to FIG. 1, the cut-off for the identified documents can be based on a variety of factors, such as limit on the number of documents identified (e.g., 10, 100, 1000, etc.), a threshold degree of relevance to the input query for each document (e.g., etc. Classification information for each of the identified documents is retrieved (step 506). The retrieved classification information can be limited to the classification (e.g., product, news, adult content, etc.) specified by the received classification request.

A classification for the input query is determined based upon the retrieved classification for the identified documents (step 508). As described above with regard to FIG. 1, the determination can be based upon a variety of manners of analyzing the document classification information, such as examining whether at least a threshold number of documents are assigned the classification, whether there is consistency between the most relevant documents (e.g., documents that are associated with the greatest amount user behavior data or the greatest quality of result statistics) and all of the documents, weighting the classification information for each document based upon the document's degree of relevance to the input query (e.g., user behavior data or quality of result statistic for the input query), etc. Example techniques for determining a classification for the input query are described below with regard to FIGS. 6A, 8, and 12.

As an illustrative example, assume the input query "skin" is received by a search engine and that the search engine would like to know whether an adult content filter should be used on results that will be returned in response. The search engine can send a request to a query classifier engine, as described above, as to whether the query "skin" is classified as adult content. The query classifier engine can examine classification information for the documents that users have found to be the most relevant to the query "skin" based upon user behavior data or quality of result statistics. For instance, the most relevant document (e.g., the document with the greatest number of long clicks) may be a medical web page discussing skin ailments. Assume that the majority of the relevant documents are not classified as adult content and that this assumption is consistent with the majority of the most relevant documents (e.g., the 10 documents with the greatest quality of result statistic for the query "skin") not being classified as adult content. Based on this analysis of classification information for the relevant documents, the query classifier engine can provide an indication that the query "skin" is not classified as adult content.

With the classification determined, the determined classification for the input query is provided (step 510). The determined classification can be provided to the entity from which the classification request originated, such as a search engine (e.g., search engine 106), a ranking engine (e.g., ranking engine 252), a rank modifier engine (e.g., rank modifier engine 254), etc.

In various implementations, the determined classification is propagated to other queries that are being executed in the same session as the input query (step 512). As described in more detail below with regard to FIGS. 7-8, a session can include a series of queries that are executed in succession by a user. Many times, these queries are related to each other. For instance, a user may execute a query and proceed to refine the query until the desired results are obtained. The original query and the refined queries can be considered part of the same session. Based upon the potential similarity between queries in the same session, a determined classification for the input query can be propagated (spread, transferred) to other queries contained within the same session as the input query.

In some implementations, the determined classification is propagated to other queries that are determined to be related to the input query through query transitions (step 514). As described in more detail below with regard to FIGS. 9-10, transitions model relatedness between queries that other search entities. In particular, query-to-query transitions model relatedness between two queries. The determined classification for the input query can be propagated to other queries that, based upon query-to-query transitions for the input query, are related to the input query. The technique 500 ends after step 514.

Referring to FIG. 5B, the technique 550 begins at step 552 by receiving a request to classify a historical query (e.g., a query previously processed). The request can be received by a query classifier engine (e.g., query classifier engine 110). The request can be an "offline" request, meaning that it is not generated for the purpose of processing a received input query. Instead, the request can be processed so that query classification information is available in the event that the historical query is received by a user as an actual input request. The request can be received can be provided to the query classifier engine by a system that determines when it is appropriate to determine or update classification information for a historical query. For instance, the system can issue a request at regular intervals of time, after the current classification for the historical query has reached a threshold age (e.g., the classification information has not been updated within the threshold amount of time), classification information for related queries and/or relevant documents has changed, etc.

Similar to the steps 504-508 described above with regard to FIG. 5B, documents that are identified as being related to the historical query are identified based upon user behavior data (or quality of result statistics) associated with the historical query and each of the documents (step 554). Classification information for each of the identified documents is retrieved (step 556). Classification of the historical query can be determined based upon classification information for the identified documents (step 558).

Classification information of the historical query is stored for future use (step 560). The classification information for the historical query can be stored in a query classification data repository. The stored classification information can be used for a variety of purposes, such as processing a received input query that is the same as the historical query, determining a classification for a document (or other search entity), etc. The steps 552-560 cover the "offline" aspects of the technique 550.

Transitioning to "online" aspects of the technique 550, similar to the step 502 described above, an input query is received and a request for classification of the input query is received (step 562). In the example technique 550 presented, the received input query is the same as the historical query for which classification information was determined in step 558. In response to the received request for classification information for the input query, classification information for the input query (same as the historical query) is retrieved and provided (step 564). The classification information can be retrieved from the query classification data repository. The classification information can be sent to a system from which the request for classification information originated, such as a search engine, a ranking engine, a rank modification engine, a filtering component, etc.

In various implementations, the retrieved classification information is propagated to other queries within the same session as the input query (step 566). In some implementations, the retrieved classification information is propagated to related queries through query-to-query transitions (step 568), further described below.

The example techniques 500 and 550 are described with reference to documents as the basis by which a classification for a query is determined. The techniques 500 and 550 can determine query classifications using other search entities, such as sites and domains. For instance, classification information for sites that are relevant to an input query (e.g., sites that host documents that have been produced in search results and selected by users in response to the input query) can be used to determine a classification for the input query. Similarly, classification information for domains that are relevant to an input query (e.g., domains that host documents that have been produced in search results and selected by users in response to the input query) can be used to determine a classification for the input query. A site or a domain can be determined to be relevant to an input query based upon aggregated user behavior data and/or quality of result statistics for documents hosted by the site or domain.

Similar techniques to the techniques 500 and 550 can be used to determine a classification for a document. For instance, a received document can be classified based upon classification information for queries identified as being related to the received document based upon user behavior data (e.g., queries for which the received document was selected in search results for the queries by users).

Figure 6A:
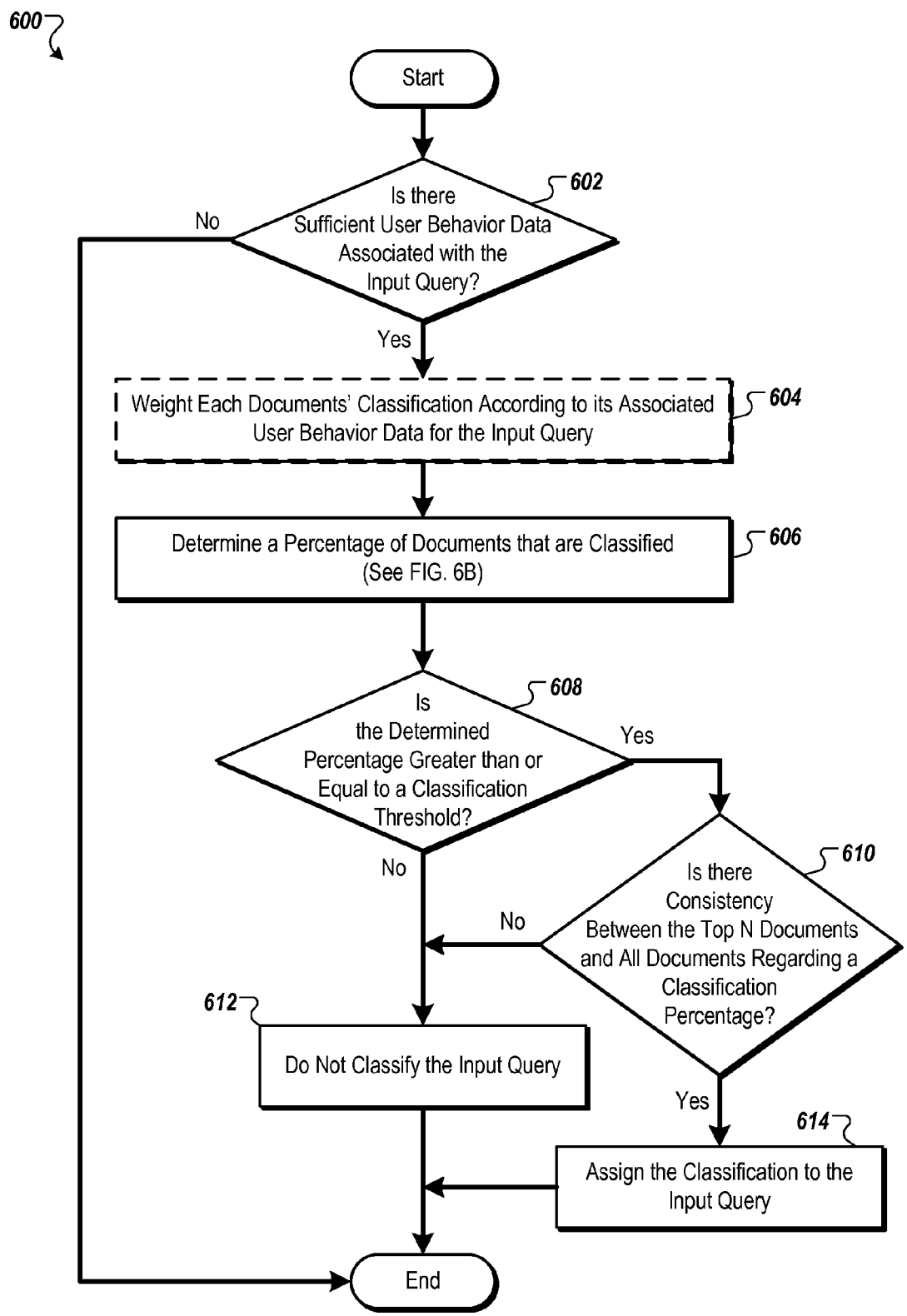
FIG. 6A is a flow chart describing an example technique for classifying a query using classification information for documents that are relevant to the query.

FIG. 6A is a flow chart describing an example technique 600 for classifying a query using classification information for documents that are relevant to the query. The technique 600 can be performed as part-of or in combination with other techniques described above and below, such as at step 508 and step 558 of techniques 500 and 550, respectively. The technique 600 can be performed by a variety of systems, for example, by the server system 214 and the query classifier engine 258, as described with reference to FIG. 2, or by the information retrieval system 300 and its query classifier engine 390, as described with reference to FIG. 3. The technique 600 is described with regard to determining a query classification using relevant documents. However, as described above with regard to techniques 500 and 550, other search entities can be used to determine classification information for a query, such as sites and documents.

The technique 600 begins at step 602 by determining if there is sufficient user behavior data associated with the input query. This determination can be made using aggregated user behavior data for documents having user behavior data associated with the input query. If there is not a sufficient (threshold) amount of user behavior data associated with the input query (e.g., 100 long clicks, 1000 long clicks, etc.), a classification that is determined from the documents can be misleading or inaccurate. For instance, if the aggregated user behavior data for an input query consists of ten instances in which users have selected documents produced as results to the input query, it is likely that a query classification based upon these ten user interactions will be inaccurate and insufficient.

In various implementations, classification information for each of the identified documents (step 604) is weighted according to the identified document's user behavior data (or quality of result statistic) associated with the input query. An identified document having a query result statistic indicating a high degree of relevance with the input query can receive a greater weight than another document having a quality of result statistic indicating a low degree of relevance. For instance, using example weights between 1.0 and 0.0 are used where 1.0 is the greatest weight and 0.0 is the smallest weight, a first document that is highly relevant can receive a weight of 1.0 and a second document that is slightly relevant can receive a weight of 0.2. These weights can be applied (e.g., multiplied, added, etc.) to classification information for the first and second documents. Given the weight of the first document being five times greater than the weight of the second document, the classification information for the first document can more greatly influence the classification of the input query than the classification information for the second document.

Search entities (e.g., documents, queries) can also be weighted according to how strongly they are associated with classification. For example, using example weights between 1.0 and 0.0 (where 1.0 indicates the strongest association and 0.0 indicates the weakest association), a first document regarding shoes for sale at an online store can receive a weight of 1.0 for the classification "product" and a 0.1 for the classification "news." The use of weights according to the strength of association with a classification can provide a number of benefits. For instance, if a group of documents propagate a weak classification (e.g., classifications with weights less than 0.05, 0.1, 0.2, 0.5, etc.) to a query, the weak classifications can, in the aggregate, provide a strong signal that the query is closely associated with the classification. Such a convergence of weak evidence of classification can yield strong overall evidence with regard to classification.

Figure 6B:
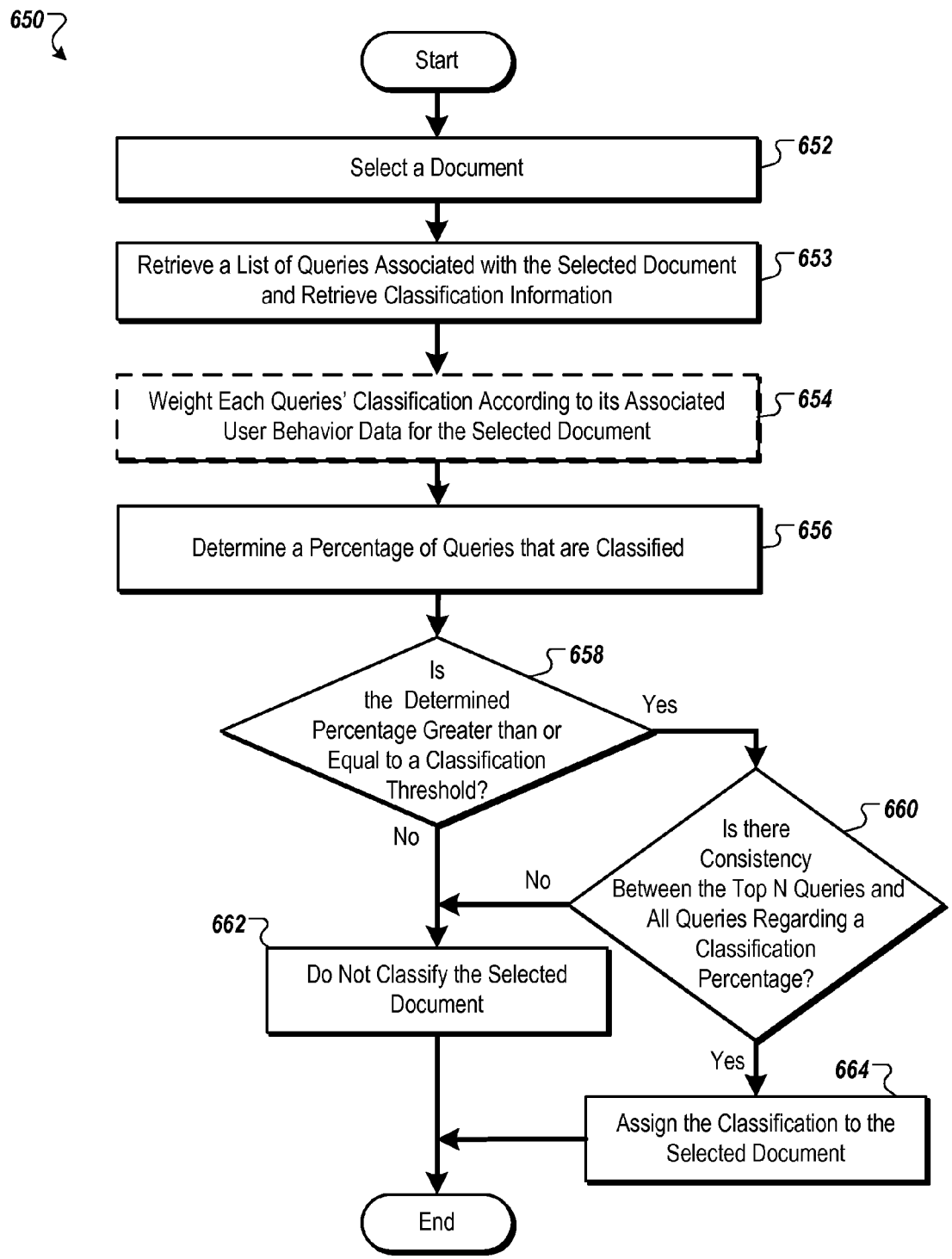
FIG. 6B is a flow chart describing an example technique for classifying a document using classification information for queries that are relevant to the document.

If there is sufficient user behavior data associated with the input query, then the percentage of documents that are assigned to a given classification (e.g., products, news, adult content, etc.) is determined (step 606). FIG. 6B provides an example technique by which documents are classified. In implementations where classification of a document is viewed in binary terms (e.g., either the document is classified or it is not classified), the percentage of documents classified can be calculated by the number of classified documents divided by the total number of identified documents. In implementations where classification information for a document is weighted or where levels of classification are used (e.g., classification can range based upon a confidence level associated with the classification), the classification information for all of the identified documents can be aggregated and then divided by the total number of identified documents (e.g., calculate an average classification for the documents).

Additionally, in some implementations multiple classifications are taken into account when determining whether to assign a classification to the input query. Classifications can be represented as vectors of evidence which can, to varying degrees, provide a positive or negative indication with regard to a particular classification. For example, if a determination is being made as to whether the input query should be assigned the classification "children," classifications other than "children" for documents related to the input query can be considered. For instance, classification of related documents as "alcohol" can provide strong negative evidence against the "children" classification being assigned to the input query (e.g., a maximum negative vector value with regard to the "children" classification). Additionally, classification of related documents as "business" may provide negative evidence against the "children" classification, but not on the magnitude of the "alcohol" classification (e.g., a negative vector value less than the maximum value with regard to the "children" classification). On the other hand, classifications of related documents can provide positive evidence for the "children" classification being assigned to the input query, such as the classification "toys."

Furthermore, in some implementations classifications are "exclusive," meaning that there contrary classifications (e.g., "alcohol" classification in relation to "children" classification) of related documents are not used when determining whether to assign a classification to the input query. In such implementations, multiple classifications of supporting classifications may be used as evidence that a classification should be assigned to the input query (e.g., "toys" classification in relation to "children" classification).

Using the determined percentage, a determination is made as to whether the percentage is greater than or equal to a threshold for assigning the classification to the input query (step 608). A classification threshold can vary depending on a variety of factors, such as the type of classification (e.g., products, adult content, news, etc.). For instance, there may be a lower threshold to classify a query as adult content than for classifying a query as news. The classification threshold can be a variety of percentages, such as 100%, 90%, 75%, 66% 50%, 33%, 25%, 5%, etc.

If the determined percentage of documents classified is greater than or equal to the classification threshold, then a determination can be made as to whether there is consistency between the classification for the top N documents and all documents (step 610). As described above with regard to FIGS. 1 and 5A, a consistency check can attempt to determine whether a percentage of the most relevant documents (the top N documents) is within a threshold variance of the determined percentage for all of the documents. The top N documents can be, of the identified document, the N documents having the most favorable user behavior data (e.g., number of long clicks) or the greatest quality of result statistics for the input query, where N is a number. For example, N can be a fixed number (e.g., 5, 10, 25, 50, etc.) or it can be based off of a percentage of the identified documents (e.g., 1%, 2%, 5%, 10%, etc.). Consistency can be determined by examining whether both the percentage of the top N documents and the percentage of all of the identified documents that are classified are greater than or equal to the classification threshold. In some implementations, consistency can be determined by examining whether the percentage of the top N documents that are classified is within a tolerance (e.g., 1%, 2%, 5%, 10%, 20%, etc.) of the percentage of all of the identified documents that are classified.

If there is consistency between the top N documents and the all of the identified documents, then the classification is assigned to the input query (step 614). If there is not consistency with the top N documents or if the determined percentage is less than the classification threshold, then the input query is not assigned the classification (step 612). The technique 600 ends after step 612 and 614.

FIG. 6B is a flow chart describing an example technique 650 for classifying a document using classification information for queries that are relevant to the document. The technique 650 can be performed as part-of or in combination with other techniques described above and below, such as at step 606 of techniques 600. The technique 650 can be performed by a variety of systems, for example, by the server system 214 and the search entity classifier engine 260, as described with reference to FIG. 2, or by the information retrieval system 300 and its search entity classifier engine 380, as described with reference to FIG. 3. The technique 650 is described with regard to determining a document classification using relevant queries. However, the technique 650 can be used to determine a classification for other search entities (e.g., site, domain, etc.) using the classification of associated queries.

The technique 650 begins at step 652 by receiving a request to determine a classification for a document. The request can be received either online (e.g., in response to processing a received input query) or offline. The request can be received by from a query classifier engine (e.g., query classifier engine 110) as part of a query classification technique. Using an inversion of the user behavior data discussed above (e.g., user behavior data that associates queries with documents instead of documents with queries), a list of the queries associated with the selected document is identified and classification information for the identified queries is retrieved (step 653). Based upon the user behavior (or quality of result statistics), the identified queries are the queries that are the most relevant to the selected document. In various implementations, the classification information retrieved for each of the queries is weighted according to the user behavior data or quality of result statistic for the query and the selected document (step 654). Classification information for a query can be weighted similar to weighting classification information for documents, as described above with regard to FIG. 6A.

Using the retrieved, and possibly weighted, classification information for the identified queries, a percentage of the queries that are classified is determined (step 656). The percentage can be determined similar to determining a percentage of classified documents, as described above with regard to FIG. 6A. Using the determined percentage, a determination is made as to whether the percentage is greater than or equal to a classification threshold (step 658). This determination can be made similar to the determination of whether the determined percentage of documents is greater than or equal to a classification threshold, as described above with regard to FIG. 6A.

If the determined percentage is greater than or equal to the classification threshold, then a consistency check can be performed between the percentage of the top N queries (e.g., the queries that are most relevant to the selected document) that are classified and the determined percentage of all identified documents (step 660). This consistency check can be performed similar to the consistency check described above with regard to FIG. 6A. If there is consistency between the top N queries and all of the identified documents, then the classification is assigned to the selected document (step 664). If there is not consistency with the top N queries or if the determined percentage is less than the classification threshold, then the classification is not assigned to the selected document (step 662). After step 662 or 664, the technique 650 ends.

The technique 650 is presented as one example of document classification. Other techniques for classifying a document can be used, such as classifying a document based upon the document's content. Various techniques of document classification can be used in concert. For instance, the technique 650 could be used on conjunction with content analysis of a document as a consistency check.

Classification information can be propagated across queries and search entities (e.g., documents, sites, domains, etc.) by running multiple alternating iterations of the techniques 600 and 650. For instance, the technique 600 could be run to determine classification information for queries. Using the updated query classification information, the technique 650 could be run to update and propagate classification information across additional documents. The number of iterations (e.g., 1, 2, 3, 4, 5, 8, 10, 15, etc.) of techniques 600 and 650 can vary depending on a variety of factors, such as the type of classification (e.g., products, adult content, etc.).

Techniques similar to the techniques 600 and 650 can be used to determine a classification for a document. For instance, a document can be classified based upon classification information for queries identified as being related to the document based upon user behavior data (e.g., queries for which the received document was selected in search results for the queries by users).

FIG. 7 illustrates an example representation of search history data 700 for multiple sessions. The search history data is collected as a user interacts with a search engine by submitting one or more queries (e.g., query B 702), clicking (e.g., selecting with a mouse or other input device, including an input device accepting touch, voice, or gesture input), on one or more search results corresponding to documents (e.g., documents D, E, and F) presented on a search results page by the search engine in response to the query, viewing the documents, and returning to the search results page. The search history session data can include the time a query is submitted (e.g., time B), what documents a user clicked on, and how long the user dwelled on the documents (e.g., entry 710).

The search history can be divided into segments corresponding to different sessions (e.g., Session A 704 and Session B 706). In general, a session is a period during which a user submits queries. A session can be measured in a number of ways including, for example, by a specified period of time (for example, thirty minutes), by a specified number of queries (for example, fifteen queries), until a specified period of inactivity (for example, ten minutes without submitting a query), while a user is logged-in to a system, or while a user submits queries that relate to similar topics.

The search history data includes information about various search entities. For example, the data 708 indicates that during Session A and at Time A, Query A was issued, and the user viewed Document A for 12.3 seconds, Document B for 14.5 seconds, and Document C for 2.0 seconds. An aggregate of search history data for a session can be termed session data.

In some implementations, the search history data is stored in an aggregated format. For example, the search history data can include aggregated click data such as a count of each click type (e.g., long, short) for a particular query and document combination.

Figure 8:
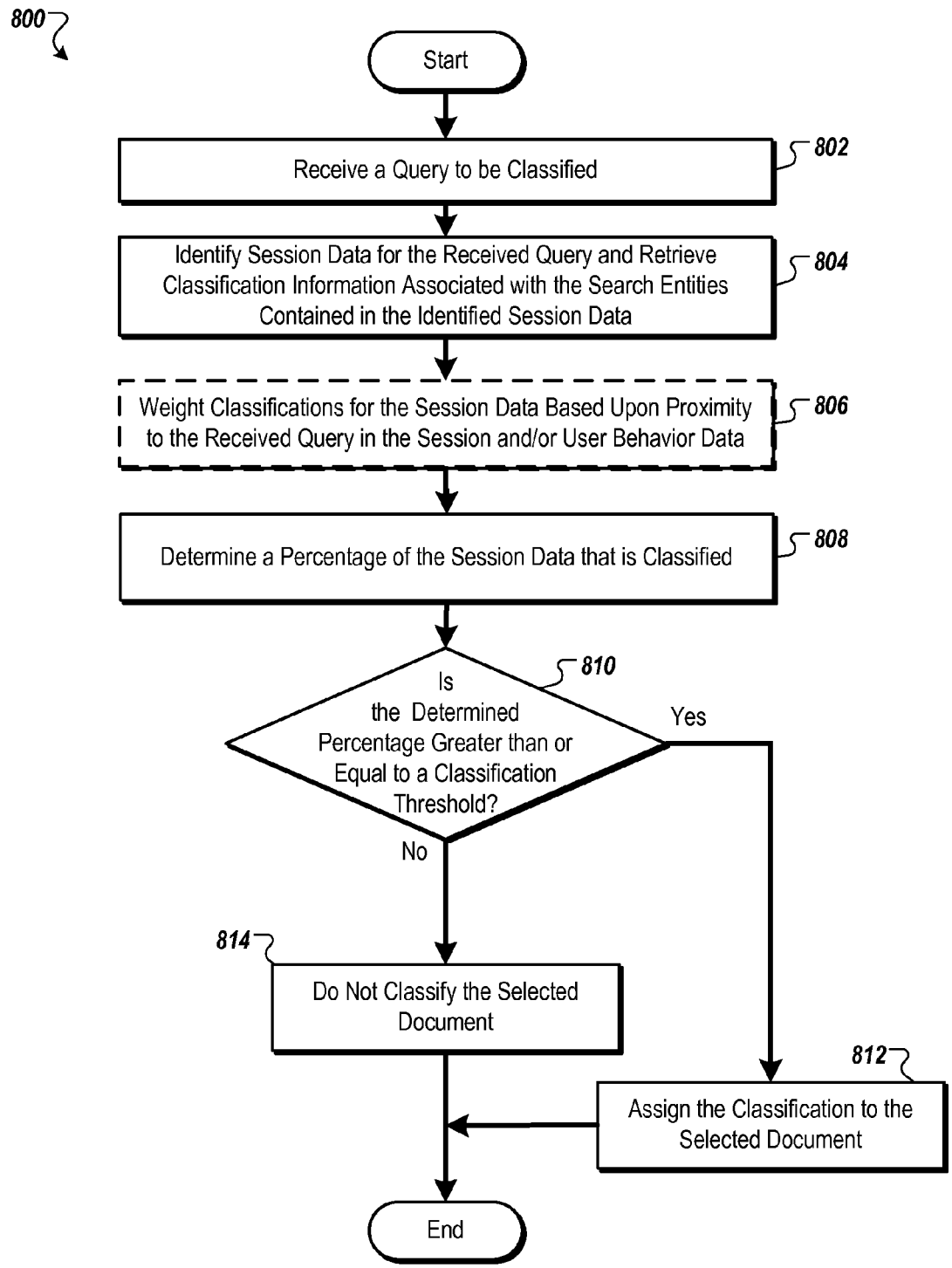
FIG. 8 is a flow chart describing an example technique for classifying a query using information associated with a session for the query being classified.

FIG. 8 is a flow chart describing an example technique 800 for classifying a query using information associated with a session for the query being classified. The technique 800 uses classification information associated with other queries submitted, documents viewed, and other search entities from a session to determine a classification for a query from the same session. The technique 800 can be performed as part-of or in combination with other techniques described above and below, such as at step 508 and step 558 of techniques 500 and 550, respectively. The technique 800 can be performed by a variety of systems, for example, by the server system 214 and the query classifier engine 258, as described with reference to FIG. 2, or by the information retrieval system 300 and its query classifier engine 390, as described with reference to FIG. 3. The technique 800 is described with regard to determining a query classification using session information. However, other search entities can be used to determine classification information for a query.

The technique 800 begins at step 802 by receiving a query to be classified. Session data associated with received query is identified and classification information associated with search entities contained in the session data are retrieved (step 804). For instance, classification information for documents and other queries contained in the identified session data can be retrieved. Referring to FIG. 7 as an example, if query B 702 is the received query, then classification data for query A and the documents A-C viewed in response to query A can be retrieved.

In various implementations, the retrieved classification information for the search entities from the identified session data are weighted (step 806). Classification information can be weighted according to a variety of factors, such as proximity of the search entity to the received query in the session, user behavior data associated with the received query and the search entity, etc. For example, a query that occurred within the session immediately prior to the received query can receive a greater weight than a query that occurred further away in time. Weighting of classification data can be performed in a similar manner to weighting described above with regard to FIGS. 6A-B.

A percentage of search entities from the identified session data that are classified is determined (step 808). The determined percentage can be calculated in a similar fashion to the percentage calculations described above with regard to FIGS. 6A-B. A determination is made as to whether the determined percentage is greater than or equal to a classification threshold (810). If the determined percentage is greater than or equal to the classification threshold, then the classification is assigned to the received query (step 812). If the determined percentage is less than the classification threshold, then the classification is not assigned to the received query (step 814). After steps 812 and 814, the technique 800 ends.

A technique similar to the technique 800 can be used to classify a received document based upon classification information associated with search entities contained in session data identified for the received document. For example, classification information for queries submitted and other documents viewed during the same session as the received document can be used to determine a classification for the received query.

Figure 9:
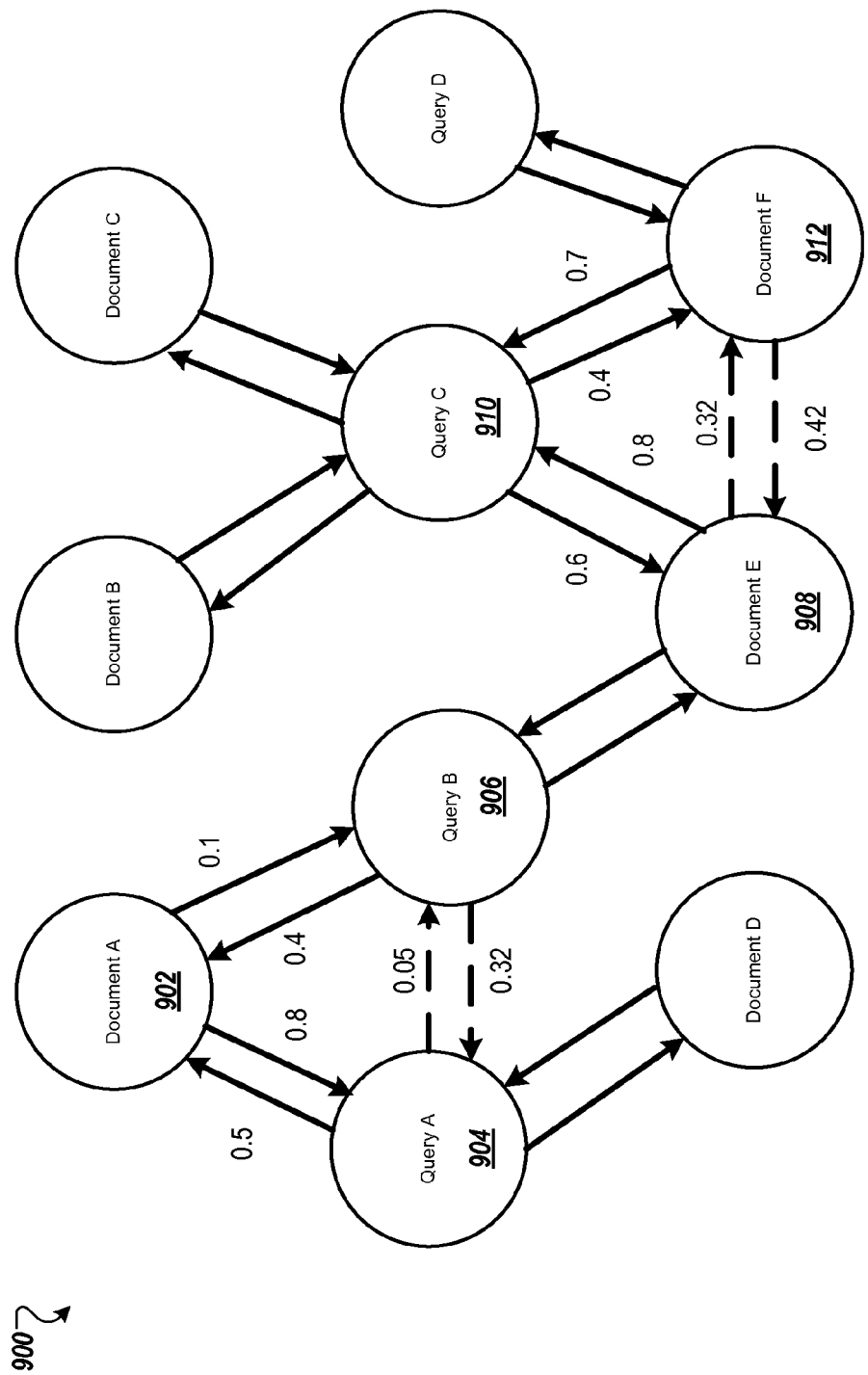
FIG. 9 is a graph illustrating transition probabilities between queries and documents.

FIG. 9 is a graph 900 illustrating transition probabilities between queries and documents. Transition probabilities regard the probability that a user will move from one search entity (e.g., query, document, etc.) to another search entity. For example, a query-to-document transition probability for a query and a document can indicate how likely a user that has submitted the query to a search engine and received search results will select the document from the search results. A query-to-query transition probability can indicate the probability that a user, having submitted a first query, will subsequently submit a second query. A document-to-query transition probability can indicate the probability that a user viewing a document will subsequently submit a search query. A document-to-document transition probability can indicate the probability that a user viewing a first document will subsequently view a second document.

Transition probabilities can be determined using a variety of techniques, such as through analysis of user behavior data, through analysis of session data, etc. For example, user behavior data can be used to determine how likely a user is to select a document in response to a query based upon previous user behavior in response to the query. In another example, session data can be used to identify how likely a user, having submitted a first query, is to submit a second query by examining a frequency with which users have submitted the second query after having submitted the first query. Transition probabilities between queries and documents can also be determined by combining query-to-document and document-to-query transition probabilities, as described below with regard to graph 900.

The graph 900 depicts example query-to-document transitions and document-to-query transitions using solid lines and query-to-query transitions and document-to-document transitions using dashed lines. In this example, query-to-query transitions and document-to-document probabilities are derived through a combination of query-to-document transition and document-to-query transition probabilities. The transition probabilities illustrated in the graph 900 can be used by a system, for example, by the search system 214 or another system, to propagate classifications among queries and documents. For example, if there is at least a threshold transition probability between a first query and a second query, then a classification for the first query can be propagated to the second query.

In the example graph 900, transition probabilities are depicted by the arrows between queries A-D and documents A-F. For example, a transition probability of 0.5 is shown as a transition probability from query A 906 to document A 902 (query-to-document transition probability) and a transition probability of 0.8 is shown as a transition probability from document A 902 to query A 904 (document-to-query transition probability).

A transition probability from query A 904 to query B 906 (and vice versa) can be determined by combining (e.g., multiply, average, aggregate, etc.) transition probabilities that connect query A 904 to query B 906. For example, query A 904 and query B 906 are connected by transition probabilities through document A 902. In the present example, transition probabilities are combined by multiplying the transition probabilities along the connecting path. For instance, a transition probability from query A 904 to query B 906 can be determined to be 0.05 (multiply transition probability from query A 904 to document A 902 (0.5) by the transition probability from document A 902 to query B 906 (0.1)). If there were multiple paths between query A 904 and query B 906, the transition probability along these other paths could be combined (e.g., multiply, aggregated, averaged, etc.) with the transition probability through document A 902. Additionally, a query-to-query transition between query A 904 and query C 910 can be determined by combining (e.g., multiplying, aggregating, averaging, etc.) transition probabilities along the path connecting query A 904 to query C 910 (e.g., a path through document A 902, query B 906, and document E 908).

As depicted by the dashed arrows between document E 908 and document F 912, transition probabilities can also be determined between documents based upon query-to-document and document-to-query transition probabilities. For instance, a transition probability of 0.32 from document E 908 to document F 912 can be determined based upon a transition from document E 908 to query C 910 (transition probability of 0.8) and from query C 910 to document F 912.

The transition probabilities used in the graph 900 can be controlled for a variety of external factors that have the possibility of introducing inaccuracies, such as artificially inflating or deflating transition probabilities. For example, the display of a visually attractive advertisement with search results can cause users to select the advertisement more than documents listed in the search results. This can cause a transition probability between the query for which the search results were generated and the documents in the search results to decrease. However, such a decrease can be inaccurate—an external factor unrelated to the documents caused the decrease. Control for such external factors can be performed when generating and determining transition probabilities.

Figure 10:
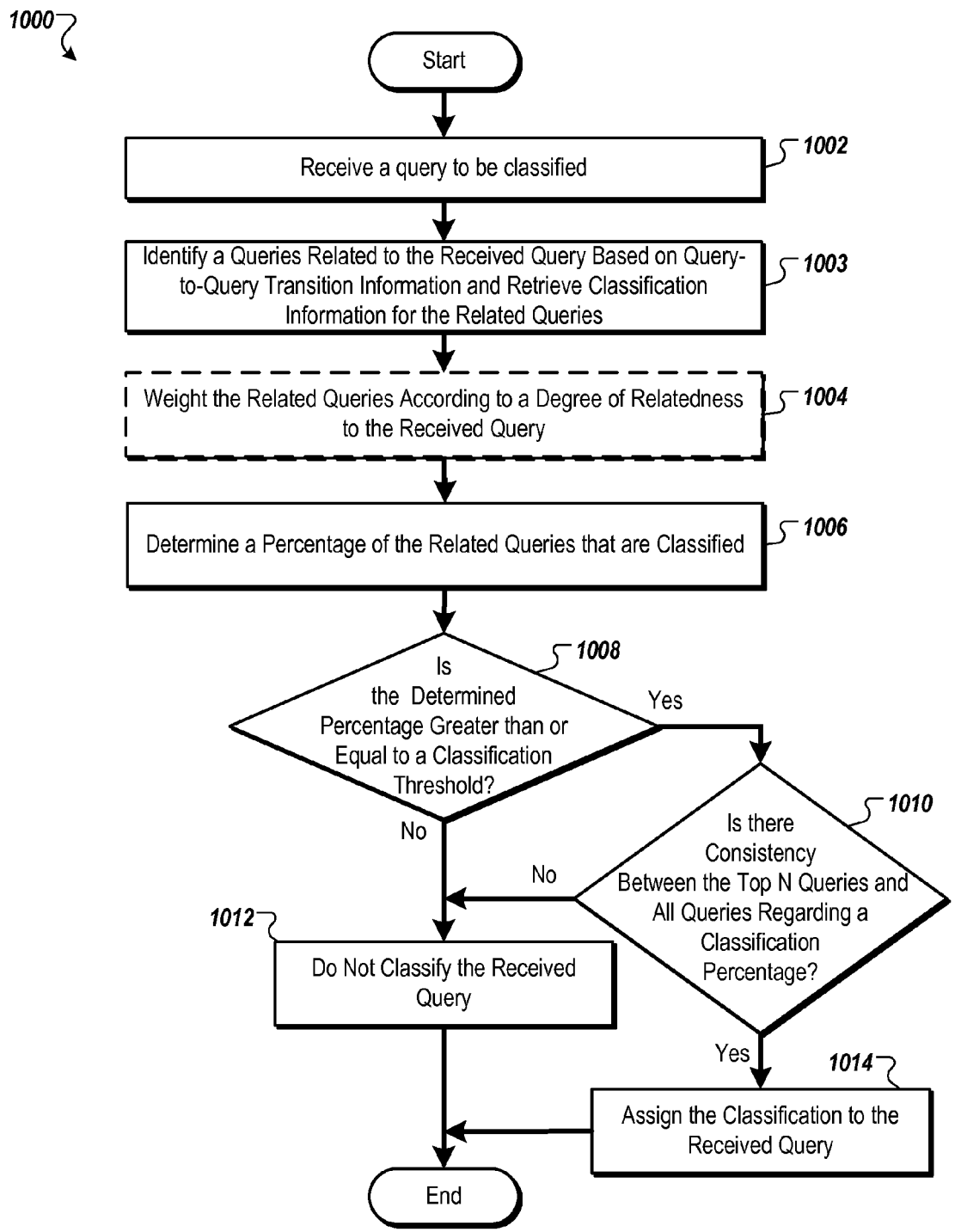
FIG. 10 is a flow chart describing an example technique for classifying a query using query-to-query transition information.

FIG. 10 is a flow chart describing an example technique 1000 for classifying a query using query-to-query transition information. The technique 1000 classifies a query using classification information associated with other related queries that are identified through query-to-query transitions with the query being classified. The technique 1000 can be performed as part-of or in combination with other techniques described above, such as at step 508 and step 558 of techniques 500 and 550, respectively. The technique 1000 can be performed by a variety of systems, for example, by the server system 214 and the query classifier engine 258, as described with reference to FIG. 2, or by the information retrieval system 300 and its query classifier engine 390, as described with reference to FIG. 3. The example technique 1000 is described with regard to determining a query classification using query-to-query transitions, such as query-to-query transitions discussed above with regard to FIG. 9. However, other transitions can be used (e.g., query-to-document transitions) to determine a classification for a query in the technique 1000.

The technique 1000 begins at step 1002 by receiving a query to be classified. Queries related to the received query are identified and classification information associated with identified queries are retrieved (step 1003). A threshold transition probability for query-to-query transition probabilities can be used to identify other queries as being sufficiently related to the received query for use in determining the classification for the received query. The most related queries to the received query are identified based upon query-to-query transition probabilities associated with the received query. The number of identified queries can be a fixed number (e.g., the 100 most related queries) or it can vary (e.g., every query with at least a threshold probability).

In various implementations, the retrieved classification information for the identified queries is weighted (step 1004). The retrieved classification information associated with an identified query can be weighted based upon a query-to-query transition probability for the identified query. Weighting of classification information can be performed in a similar manner to weighting described above with regard to FIGS. 6A-B.

A percentage of the identified queries that are classified is determined (step 1006). The determined percentage can be calculated in a similar fashion to the percentage calculations described above with regard to FIGS. 6A-B. A determination is made as to whether the determined percentage is greater than or equal to a classification threshold (step 1008). If the determined percentage is greater than or equal to the classification threshold, then a consistency check can be performed (step 1010). The consistency check can determine whether a percentage of the top N related queries (e.g., the N queries having the greatest query-to-query transition probability with respect to the received query) that are classified is consistent with the determined percentage of all the identified queries that are classified (step 1010). The consistency check can be performed in a similar manner to the consistency checks described above with regard to FIGS. 6A-B.

If there is consistency with the top N queries, then the classification is assigned to the received query (step 1014). If the determined percentage is less than the classification threshold or if there is not consistency with the top N queries, then the classification is not assigned to the received query (step 1012). After steps 1012 and 1014, the technique 1000 ends.

The technique 1000 can also be performed using query-to-document and/or document-to-query transition probabilities (instead of or in combination with query-to-query transition probabilities) to propagate classifications to the received query. For example, classification information for documents that are identified as being related to a query through document-to-query and/or query-to-document transition probabilities can be used to determine a classification for the received query.

A technique similar to the technique 1000 can be used to determine classifications for documents based upon document-to-document, query-to-document, and/or document-to-query transition probabilities. For example, a received document can be classified based upon classification information for queries and/or documents that are identified as being related to the received document based upon transition probabilities.

Figure 11:
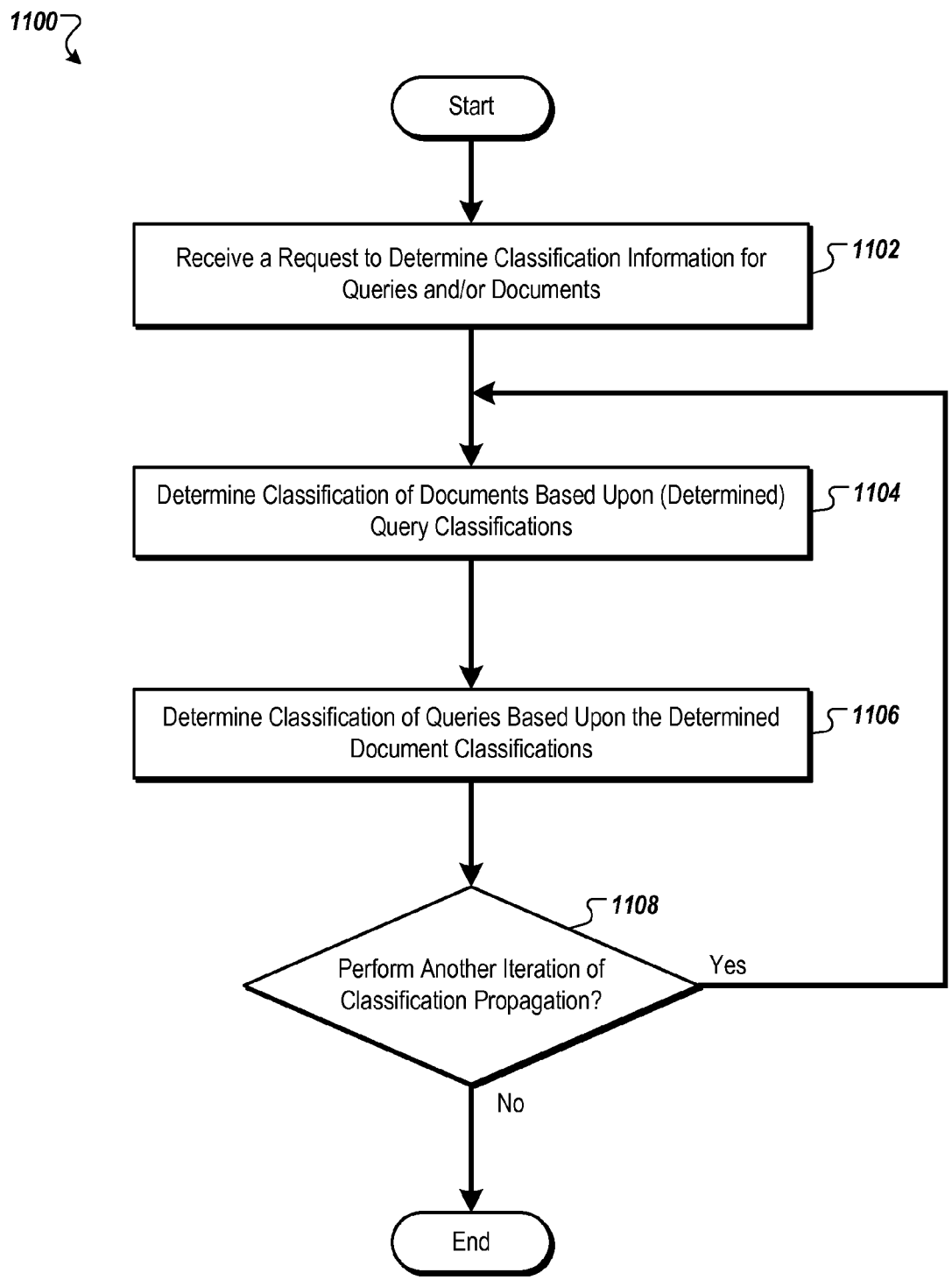
FIG. 11 is a flow chart describing an example technique for iteratively propagating classifications across queries and documents.

FIG. 11 is a flow chart describing an example technique 1100 for iteratively propagating classifications across queries and documents. The technique 1100 alternates between propagating classifications from documents to queries and queries to documents until a threshold number of iterations has been reached. The technique 1100 can be performed by a variety of systems, for example, by the server system 214 and the query classifier engine 258, as described with reference to FIG. 2, or by the information retrieval system 300 and its query classifier engine 390, as described with reference to FIG. 3.

The technique 1100 begins at step 1102 by receiving a request to determine classification information for queries and/or documents. The request can be received as part of a variety of techniques, such as an offline process to update classification information, as part of a online processing of a search query, as part of a document filtering operation, etc.

In response to the received query, classifications of documents can be determined based upon query classifications (step 1104), and classifications of queries can be determined based upon the determined document classifications (step 1106). Step 1106 can be performed before step 1104 such that query classifications are determined based upon document classification and then document classifications are determined based upon the determined query classifications. Classification determinations can be performed using a variety of techniques, such as the techniques 500, 550, 600, 650, 800, and 1000, described above.

A determination can be made as to whether to perform another iteration of classification propagation across documents and queries (step 1108). Such a determination can be based upon a variety of factors, such as a threshold number of iterations (e.g., 2, 3, 5, 8, 13, 20, etc.), convergence of document and/or query classifications (e.g., iteration at which a classification has stopped being propagated to a threshold number of new queries and/or documents), etc. If an additional should be performed, then steps 1104 and/or 1106 are repeated. If a sufficient number of iterations have been performed, then the technique 1100 ends.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
   receiving, at a computer system, a request to determine whether to assign a classification to a first query;
   selecting, by the computer system, a plurality of search entities that are associated with the first query based on respective user behavior data for the first query associated with each of the search entities;
   determining a first measure of how many of the plurality of search entities have been assigned the classification;

determining that the first measure of how many of the plurality of search entities have been assigned the classification satisfies a classification threshold;

in response to determining that the first measure of how many of the plurality of search entities have been assigned the classification satisfies the classification threshold, determining a second measure of how many of a top group of search entities from the plurality of search entities have been assigned the classification, each search entity in the top group of search entities being in a subset of the plurality of search entities having highest respective measures of relevance to the query based on the user behavior data;

determining, by the computer system that the first measure of how many of the plurality of search entities have been assigned the classification is consistent with the second measure of how many of the top group of search entities have been assigned the classification; and in response to determining that the first measure of how many of the plurality of search entities have been assigned the classification is consistent with the second measure of how many of the top group of search entities have been assigned the classification, assigning the classification to the first query.

2. The method of claim 1, wherein the plurality of identified search entities comprises a plurality of documents, and wherein the respective user behavior data associated with each document of the plurality of documents represents user behavior relative to the document when provided as a search result for the first query.

3. The method of claim 1, wherein the plurality of identified search entities comprises a plurality of sites, and wherein the respective user behavior data associated with each site of the plurality of sites represents user behavior relative to one or more documents on the site when the one or more documents were provided as search results for the first query.

4. The method of claim 1, wherein the plurality of identified search entities comprises a plurality of web domains, and wherein the respective user behavior data associated with each web domain of the plurality of web domains represents user behavior relative to one or more documents in the web domain when the one or more documents were provided as search results for the first query.

5. The method of claim 1, wherein the plurality of identified search entities comprises a plurality of second queries distinct from the first query.

6. The method of claim 5, wherein the respective user behavior data associated with each second query of the plurality of second queries represents a likelihood of the first query being submitted in a same query session as the second query.

7. The method of claim 1, further comprising:

selecting a subgroup of search entities from the top group of search entities, each search entity in the subgroup of search entities being in a subset of the top group of search entities having highest respective measures of relevance to the query based on the user behavior data; and determining a third measure of how many of the subgroup of search entities have been assigned the classification, wherein assigning the classification to the first query is further based on determining whether the third measure is consistent with the second measure, wherein the third measure is determined to be consistent with the second measure when the third measure is within a consistency threshold of the second measure.

8. The method of claim 1, wherein determining the first measure of how many of the plurality of search entities have been assigned the classification comprises:

determining the first measure of how many of the plurality of search entities have been assigned the classification according to respective weights for the classification assigned to each of the plurality of search entities, the weights being based on the user behavior data associated with each of the plurality of search entities.

9. The method of claim 1, wherein selecting the plurality of search entities that are associated with the first query based on respective user behavior data for the first query associated with each of the search entities comprises selecting search entities having at least a threshold amount of user behavior data associated with the first query.

10. The method of claim 1, further comprising providing the classification assigned to the first query as input to a document ranking process for ranking a plurality of documents in response to the first query.

11. The method of claim 1, wherein a value of the classification threshold is based on a type of the classification.

12. A computer program product encoded on a non-transitory computer-readable medium, operable to cause a data processing apparatus to perform operations comprising:

receiving a request to determine whether to assign a classification to a first query;

selecting a plurality of search entities that are associated with the first query based on respective user behavior data for the first query associated with each of the search entities;

determining a first measure of how many of the plurality of search entities have been assigned the classification;

determining that the first measure of how many of the plurality of search entities have been assigned the classification satisfies a classification threshold;

in response to determining that the first measure of how many of the plurality of search entities have been assigned the classification satisfies the classification threshold, determining a second measure of how many of a top group of search entities from the plurality of search entities have been assigned the classification, each search entity in the top group of search entities being in a subset of the plurality of search entities having highest respective measures of relevance to the query based on the user behavior data;

determining that the first measure of how many of the plurality of search entities have been assigned the classification is consistent with the second measure of how many of the top group of search entities have been assigned the classification; and in response to determining that the first measure of how many of the plurality of search entities have been assigned the classification is consistent with the second measure of how many of the top group of search entities have been assigned the classification, assigning the classification to the first query.

13. The computer program product of claim 12, wherein the plurality of identified search entities comprises a plurality of documents, and wherein the respective user behavior data associated with each document of the plurality of documents represents user behavior relative to the document when provided as a search result for the first query.

14. The computer program product of claim 12, wherein the plurality of identified search entities comprises a plurality of sites, and wherein the respective user behavior data associated with each site of the plurality of sites represents user behavior relative to one or more documents on the site when the one or more documents were provided as search results for the first query.

15. The computer program product of claim 12, wherein the plurality of identified search entities comprises a plurality of web domains, and wherein the respective user behavior data associated with each web domain of the plurality of web domains represents user behavior relative to one or more documents in the web domain when the one or more documents were provided as search results for the first query.

16. The computer program product of claim 12 wherein the plurality of identified search entities comprises a plurality of second queries distinct from the first query.

17. The computer program product of claim 16, wherein the respective user behavior data associated with each second query of the plurality of second queries represents a likelihood of the first query being submitted in a same query session as the second query.

18. A system for determining a classification for a query, the system comprising:
   one or more servers;
   an interface to the one or more servers configured to receive a request to determine whether to assign a classification to a first query;
   a search entity classifier engine installed on the one or more servers that is configured to select a plurality of search entities that are associated with the first query based on respective user behavior data for the first query associated with each of the search entities; and
   a query classifier engine installed on the one or more servers that is configured to:
      determine a first measure of how many of the plurality of search that have been assigned the classification;
      determine that the first measure of how many of the plurality of search entities have been assigned the classification satisfies a classification threshold;
      in response to determining that the first measure of how many of the plurality of search entities have been assigned the classification satisfies the classification threshold, determine a second measure of how many of a top group of search entities from the plurality of search entities have been assigned the classification, each search entity in the top group of search entities being in a subset of the plurality of search entities having highest respective measures of relevance to the query based on the user behavior data;
      determine that the first measure of how many of the plurality of search entities have been assigned the classification is consistent with the second measure of how many of the top group of search entities have been assigned the classification; and
      in response to determining that the first measure of how many of the plurality of search entities have been assigned the classification is consistent with the second measure of how many of the top group of search entities have been assigned the classification, assign the classification to the first query.

19. The system of claim 18, wherein the plurality of identified search entities comprises a plurality of documents, and wherein the respective user behavior data associated with each document of the plurality of documents represents user behavior relative to the document when provided as a search result for the first query.

20. The system of claim 18, wherein the plurality of identified search entities comprises a plurality of sites, and wherein the respective user behavior data associated with each site of the plurality of sites represents user behavior relative to one or more documents on the site when the one or more documents were provided as search results for the first query.

21. The method of claim 1, wherein determining that the first measure of how many of the plurality of search entities have been assigned the classification is consistent with the second measure of how many of the top group of search entities have been assigned the classification comprises determining that the second measure satisfies the classification threshold or determining that the second measure is within a consistency threshold of the first measure.

22. The computer program product of claim 12, wherein determining that the first measure of how many of the plurality of search entities have been assigned the classification is consistent with the second measure of how many of the top group of search entities have been assigned the classification comprises determining that the second measure satisfies the classification threshold or determining that the second measure is within a consistency threshold of the first measure.

23. The system of claim 18, wherein determining that the first measure of how many of the plurality of search entities have been assigned the classification is consistent with the second measure of how many of the top group of search entities have been assigned the classification comprises determining that the second measure satisfies the classification threshold or determining that the second measure is within a consistency threshold of the first measure.

* * * * *